(12) United States Patent
Lee et al.

(10) Patent No.: US 7,774,029 B2
(45) Date of Patent: Aug. 10, 2010

(54) APPARATUS AND METHOD FOR CONTROLLING A FUNCTION OF A WIRELESS TERMINAL

(75) Inventors: Jae-Ho Lee, Gumi-si (KR); Ji-Hwa Kim, Gyeongsangbuk-do (KR); Do-Hwan Choi, Daegu (KR); Yeong-Moo Ryu, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1499 days.

(21) Appl. No.: 11/119,800

(22) Filed: May 3, 2005

(65) Prior Publication Data

US 2006/0019714 A1    Jan. 26, 2006

(30) Foreign Application Priority Data

Jul. 10, 2004   (KR) ...................... 10-2004-0053810
Aug. 19, 2004  (KR) ...................... 10-2004-0065337

(51) Int. Cl.
*H04B 1/38*    (2006.01)
*H04M 1/00*   (2006.01)

(52) U.S. Cl. .................................. 455/566; 455/575.3

(58) Field of Classification Search .............. 455/550.1, 455/566, 575.1, 575.3, 347, 351; 379/433.01, 379/433.04, 433.13
See application file for complete search history.

(56) References Cited

U.S. PATENT DOCUMENTS 4,845,772 A * 7/1989 Metroka et al. ............. 455/574
7,190,977 B2 * 3/2007 Hikishima ................... 455/566
2002/0119802 A1   8/2002 Hijii
2003/0153283 A1 * 8/2003 Kuwazoe ..................... 455/90
2004/0176047 A1 * 9/2004 Trively ....................... 455/90.3
2005/0090290 A1 * 4/2005 Hama et al. ................. 455/566

FOREIGN PATENT DOCUMENTS

| CN | 1433653 | | 7/2003 |
| CN | 1469618 | A | 1/2004 |
| JP | 2002-078073 | A | 7/2002 |
| WO | WO 03/054672 | A1 | 7/2003 |

* cited by examiner

*Primary Examiner*—Nguyen Vo
(74) *Attorney, Agent, or Firm*—Roylance, Abrams, Berdo & Goodman, L.L.P.

(57) ABSTRACT

Disclosed is an apparatus and method for controlling a wireless terminal. The apparatus comprises a folder opening/closing detection module detecting opening/closing states of folder housings pivoting away from a body housing of the terminal in different directions and generating opening/closing detection signals, a key input module comprising input modules each having inner and external key(s), a display module comprising a first display module disposed in one of the folder housings and a second display module disposed in the body housing, a position detection module detecting a terminal position and generating position detection signals, a voice inputting/outputting module comprising input/output modules each having a speaker and a microphone and mounted on different sides of the terminal, rotary-type speakers each rotatably mounted inside one of the folder housings, and a control module controlling said input/output and display modules (including speakers) according to the folder opening/closing signals and/or the generated position signals.

34 Claims, 20 Drawing Sheets

APPARATUS AND METHOD FOR CONTROLLING A FUNCTION OF A WIRELESS TERMINAL

PRIORITY

This application claims the benefit under 35 U.S.C. 119(a) of an application entitled "Apparatus and Method for Controlling Function of Wireless Terminal" filed in the Korean Intellectual Property Office on Jul. 10, 2004 and assigned Serial No. 2004-53810 and to a Korean patent application filed on Aug. 19, 2004 and assigned Serial No. 2004-65337, the entire contents of which are incorporated herein by reference.

BACKGROUND OF THE INVENTION

1. Field of the Invention

The present invention relates to a wireless terminal. More particularly, the present invention relates to an apparatus and a method for controlling a key input part, a display part, and a rotary-type speaker of a wireless terminal according to folder housing opening/closing states in the wireless terminal and control a voice inputting/outputting module of the wireless terminal according to positions of the wireless terminal.

2. Description of the Related Art

Wireless terminal technology has evolved to provide various functions capable of transmitting high-speed data in addition to a voice communication function. In other words, if a mobile communication network adaptable for an IMT 2000 standard is realized, high-speed data communication as well as voice communication can be achieved by using the wireless terminal. Herein, data processed by the wireless terminal may include packet data and image data. In addition, wireless terminals have been equipped with a function capable of displaying a moving picture by adding a camera and a TV receiver to the wireless terminal. Accordingly, the wireless terminal having a camera not only can display moving pictures and still pictures by photographing images, but also can transmit the photographed images. In addition, the wireless terminal having a TV receiver can display received image signals. Recently, wireless terminals are being manufactured in a structure adaptable for games. In a game mode, wireless terminals for games have a structure convenient for users. For instance, wireless terminals are equipped with two key input parts in order to allow a user to conveniently use wireless terminals when playing games. Therefore, automatic control of the functions for the games in wireless terminals will provide enhanced convenience to users of the terminals.

SUMMARY OF THE INVENTION

Accordingly, the present invention has been made to solve the above-mentioned problems occurring in the prior art, and an object of the present invention is to provide an apparatus and a method, which can control a function of a key input module according to opening/closing states of a folding wireless terminal.

It is another object of the present invention to provide an apparatus and a method, which can control a function of a display module according to opening/closing states of a folding wireless terminal.

It is still another object of the present invention to provide an apparatus and a method, which can control a speaker and a microphone disposed in at least two voice outputting modules of a wireless terminal according to positions of the wireless terminal.

It is still another object of the present invention to provide an apparatus and a method, which can control a rotary-type speaker according to folder housing opening/closing states in a wireless terminal.

To accomplish the above objects, there is provided an apparatus for controlling a key input function and a display function in a wireless terminal, the apparatus comprising a folder opening/closing detection module which comprises magnets disposed in the wireless terminal and sensors for detecting the magnets, detects a folder housing opening/closing state in the wireless terminal, and generates a folder opening/closing detection signal, a key input module which comprises a first key input module having an inner key and an external key and a second key input module having an inner key and an external key, the first key input module and the second key input module being disposed in the first folder housing and the second folder housing which pivot away from a body housing of the wireless terminal in different directions, respectively, a display module which has a first display module disposed in the second folder housing and a second display module disposed in the body housing, and a control module which controls the functions of the key input module and the display module according to the folder opening/closing signal generated from the folder opening/closing detection module.

According to another aspect of the present invention, there is provided an apparatus for controlling a key input function and a display function in a wireless terminal, comprising a folder opening/closing detection module which comprises magnets disposed in the wireless terminal and sensors for detecting the magnets, detects opening/closing states of a first folder housing and a second folder housing pivoting away from a body housing of the wireless terminal in different directions and generates a first opening/closing signal to a fourth folder opening/closing signal, a key input module which comprises a first key input module disposed in the first folder housing and a second key input module disposed in the second folder housing, the first key input module including an inner key and an external key, the second key input module including an inner key and an external key, a display module which comprises a first display module disposed in the second folder housing and a second display module disposed in the body housing, and a control module which controls the functions of the key input module and the display module according to folder opening/closing detection signals generated from the folder opening/closing detection module.

According to another aspect of the present invention, there is provided an apparatus for controlling a key input function and a display function in a wireless terminal, comprising a folder opening/closing detection module which comprises magnets disposed in the wireless terminal and sensors for detecting the magnets, detects opening/closing states of a first folder housing and a second folder housing pivoting away from a body housing of the wireless terminal in different directions, and generates a first to a fourth folder opening/closing signals, a key input module which comprises a first key input module disposed in the first folder housing and a second key input module disposed in the second folder housing, the first key input module including an inner key and an external key, the second key input module including an inner key and an external key, a display module which comprises a first display module disposed in the second folder housing and a second display module disposed in the body housing, and a control module, wherein the control module activates the first display module, the external key of the first key input module, and the external key of the second key input module and deactivates the second display module, the inner key of the first key input module, and the inner key of the second key input module when the first folder opening/closing signal is generated, the control module activates the first display module, the first screen of the second display module, the inner key of the first key input module, and the external key of the second key input module and deactivates the second screen of the second display module, the external key of the first key input module, and the inner key of the second key input module when the second folder opening/closing signal is generated, the control module activates the second screen of the second display module, the external key of the first key input module, and the inner key of the second key input module and deactivates the first display module, the first screen of the second display module, the inner key of the first key input module, and the external key of the second key input module when the third folder opening/closing detection signal is generated, and the control module activates the second display module, the inner key of the first key input module, and the inner key of the second key input module and deactivates the first display module, the external key of the first key input module, and the external key of the second key input module when the fourth folder opening/closing detection signal is generated.

According to another aspect of the present invention, there is provided an apparatus for controlling a rotary-type speaker in a wireless terminal, the apparatus comprising a folder opening/closing detection module which includes magnets disposed in the wireless terminal and sensors detecting the magnets, detects opening/closing states of a first folder housing and a second folder housing pivoting away from a body housing of the wireless terminal in different directions, and generates a first folder opening/closing detection signal to a fourth folder opening/closing detection signal, a first rotary-type speaker and a second rotary-type speaker rotatably mounted inside the first folder housing and the second folder housing, respectively, and a control module for controlling the first rotary-type speaker and the second rotary-type speaker to be deactivated when the first folder opening/closing detection signal is generated, controlling the first rotary-type speaker to be activated and the second rotary-type speaker to be deactivated when the second folder opening/closing detection signal is generated, controlling the first rotary-type speaker to be deactivated and the second rotary-type speaker to be activated when the third folder opening/closing detection signal is generated, and controlling the first rotary-type speaker and the second rotary-type speaker to be activated when the fourth folder opening/closing detection signal is generated.

According to another aspect of the present invention, there is provided an apparatus for controlling a voice input/output function in a wireless terminal, comprising a position detection module which comprises a sensor, detects a position of the wireless terminal, and generates a first position detection signal and a second position detection signal, a voice inputting/outputting module which comprises a first voice inputting/outputting module mounted on one side of the wireless terminal and a second voice inputting/outputting module mounted on another side of the wireless terminal, and a control module which controls functions of the voice inputting/outputting module according to position detection signals generated from the position detection module.

According to another aspect of the present invention, there is provided an apparatus for controlling a voice input/output function in a wireless terminal, comprising a position detection module which comprises a sensor, detects a position of the wireless terminal, and generates a first position detection signal and a second position detection signal, a voice inputting/outputting module which comprises a first voice inputting/outputting module mounted on one side of the wireless terminal and a second voice inputting/outputting module mounted on another side of the wireless terminal, the first voice inputting/outputting module comprising a first microphone and a first speaker, the second voice inputting/outputting module comprising a first speaker and a second microphone, and a control module, wherein the control module activates the first speaker of the first voice inputting/outputting module and the second microphone of the second voice inputting/outputting module and deactivates the first microphone of the first voice inputting/outputting module and the second speaker of the second voice inputting/outputting module when the first position detection signal is generated, and the control module activates the first microphone of the first voice inputting/outputting module and the second speaker of the second voice inputting/outputting module and deactivates the first speaker of the first voice inputting/outputting module and the second microphone of the second voice inputting/outputting module when the second position detection signal is generated.

According to another aspect of the present invention, there is provided an apparatus for controlling functions of a wireless terminal, comprising a folder opening/closing detection module which comprises magnets in the wireless terminal and sensors for detecting the magnet, detects opening/closing states of a first folder housing and a second folder housing pivoting away from a body housing of the wireless terminal in different directions, and generates a first opening/closing detection signal to a fourth opening/closing detection signal, a key input module which comprises a first key input module having an inner key and an external key and a second key input module having an inner key and an external key, the first key input module and the second key input module included in the first folder housing and the second folder housing pivoting away from the body housing of the wireless terminal in different directions, respectively, a display module which comprises a first display module disposed in the second folder housing of the wireless terminal and a second display module in the body housing of the wireless terminal, a position detection module which has sensors in the wireless terminal, detects a position of the wireless terminal, and generates a first position detection signal to a second position detection signal, a voice inputting/outputting module which comprises a first voice inputting/outputting module and a second voice inputting/outputting module, wherein the first voice inputting/outputting module comprises a first speaker and a first microphone and being mounted on one side of the wireless terminal and a second voice inputting/outputting module comprises a second speaker and a second microphone and being mounted on another side of the wireless terminal, a first rotary-type speaker and a second rotary-type speaker rotatably mounted inside the first folder housing and the second folder housing, respectively; and a control module which controls functions of the key input module, the display module, and the rotary-type speaker according to the first folder opening/closing signal to the fourth folder opening/closing signal generated from the folder opening/closing detection module and controls a function of the voice inputting/outputting module according to the first position detection signal and the second position detection signal generated from the position detection module.

According to another aspect of the present invention, there is provided a method for controlling functions of a key input module and a display module in a wireless terminal, the method comprising the steps of detecting a folder housing opening/closing state in the wireless terminal, detecting a folder opening/closing signal according to the folder housing opening/closing state in the wireless terminal, and controlling the key input module and the display module of the wireless terminal according to the detected folder opening/closing signal.

According to another aspect of the present invention, there is provided a method for controlling functions of a key input module and a display module in a wireless terminal. The method comprising the steps of detecting a folder housing opening/closing state in the wireless terminal, detecting a folder opening/closing detection signal according to the folder housing opening/closing state in the wireless terminal, if the detected folder opening/closing detection signal is a first folder opening/closing detection signal, activating a first display module, an external key of a first key input module, and an external key of the second key input module and deactivating a second display module, an inner key of the first key input module, and the inner key of the second key input module, if the detected folder opening/closing detection signal is a second folder opening/closing detection signal, activating the first display module, a second screen of the second display module, the inner key of the first key input module, and the external key of the second key input module and deactivating the second screen of the second display module, the external key of the first key input module, and the inner key of the second key input module, if the detected folder opening/closing detection signal is a third folder opening/closing detection signal, activating the second screen of the second display module, the external key of the first key input module, and the inner key of the second key input module and deactivating the first display module, the first screen of the second display module, the inner key of the first key input module, and the external key of the second key input module, and if the detected folder opening/closing detection signal is a fourth folder opening/closing detection signal, activating the second display module, the inner key of the first key input module, and the inner key of the second key input module and deactivating the first display module, the external key of the first key input module, and the external key of the second key input module.

According to another aspect of the present invention, there is provided a method for controlling a rotary-type speaker in a wireless terminal, the method comprising the steps of detecting folder housing opening/closing states of the wireless terminal, detecting a folder opening/closing signal according to the folder housing opening/closing states of the wireless terminal, controlling the first rotary-type speaker and the second rotary-type speaker to be deactivated when the detected folder opening/closing signal is a first folder opening/closing detection signal, controlling the first rotary-type speaker to be activated and the second rotary-type speaker to be deactivated when the detected folder opening/closing signal is a second folder opening/closing detection signal, controlling the first rotary-type speaker to be deactivated and the second rotary-type speaker to be activated when the detected folder opening/closing signal is a third folder opening/closing detection signal, and controlling the first rotary-type speaker and the second rotary-type speaker to be activated when the detected folder opening/closing signal is a fourth folder opening/closing detection signal.

According to another aspect of the present invention, there is provided a method for controlling a function of a voice inputting/outputting module in a wireless terminal. The method comprising the steps of detecting a position of the wireless terminal, detecting a position signal according to the position of the wireless terminal, and controlling a speaker and a microphone of the voice inputting/outputting module of the wireless terminal according to the detected position signal.

According to another aspect of the present invention, there is provided a method for controlling a function of a voice inputting/outputting in a wireless terminal. The method comprising the steps of detecting a position of the wireless terminal, detecting a position signal according to the position of the wireless terminal, if the detected position signal is a first position detection signal, activating a first speaker of a first voice inputting/outputting module and a second microphone of a second voice inputting/outputting module and deactivating a first microphone of the first voice inputting/outputting module and a second speaker of the second voice inputting/outputting module, and if the detected position signal is a second position detection signal, activating the first microphone of the first voice inputting/outputting module and the second speaker of the second voice inputting/outputting module and deactivating the first speaker of the first voice inputting/outputting module and the second microphone of the second voice inputting/outputting module.

According to another aspect of the present invention, there is provided a method for controlling functions of a wireless terminal. The method comprising the steps of when a folder housing opening/closing state in the wireless terminal is detected, detecting a folder opening/closing signal according to the folder housing opening/closing state in the wireless terminal, controlling a key input module and a display module in the wireless terminal according to the detected folder opening/closing signal, controlling a rotary-type speaker in the wireless terminal according to the detected folder opening/closing signal, when a position of the wireless terminal is detected, detecting a position signal according to the position of the wireless terminal, and controlling a microphone and a speaker of a voice inputting/outputting module of the wireless terminal according to the detected position signals.

BRIEF DESCRIPTION OF THE DRAWINGS

The above and other objects, features and advantages of the present invention will be more apparent from the following detailed description taken in conjunction with the accompanying drawings, in which.

Throughout the drawings, the same or similar elements are denoted by the same reference numerals.

DETAILED DESCRIPTION OF EXEMPLARY EMBODIMENTS

Hereinafter, embodiments of the present invention will be described in detail with reference to the accompanying drawings. In the following description of the present invention, a detailed description of known functions and configurations incorporated herein will be omitted for conciseness.

Hereinafter, according to an embodiment of the present invention, a wireless terminal having a camera will be described by way of example. In addition, the present invention may be applied to a wireless terminal having a TV receiver as well as a wireless terminal without the camera.

Figure 1:
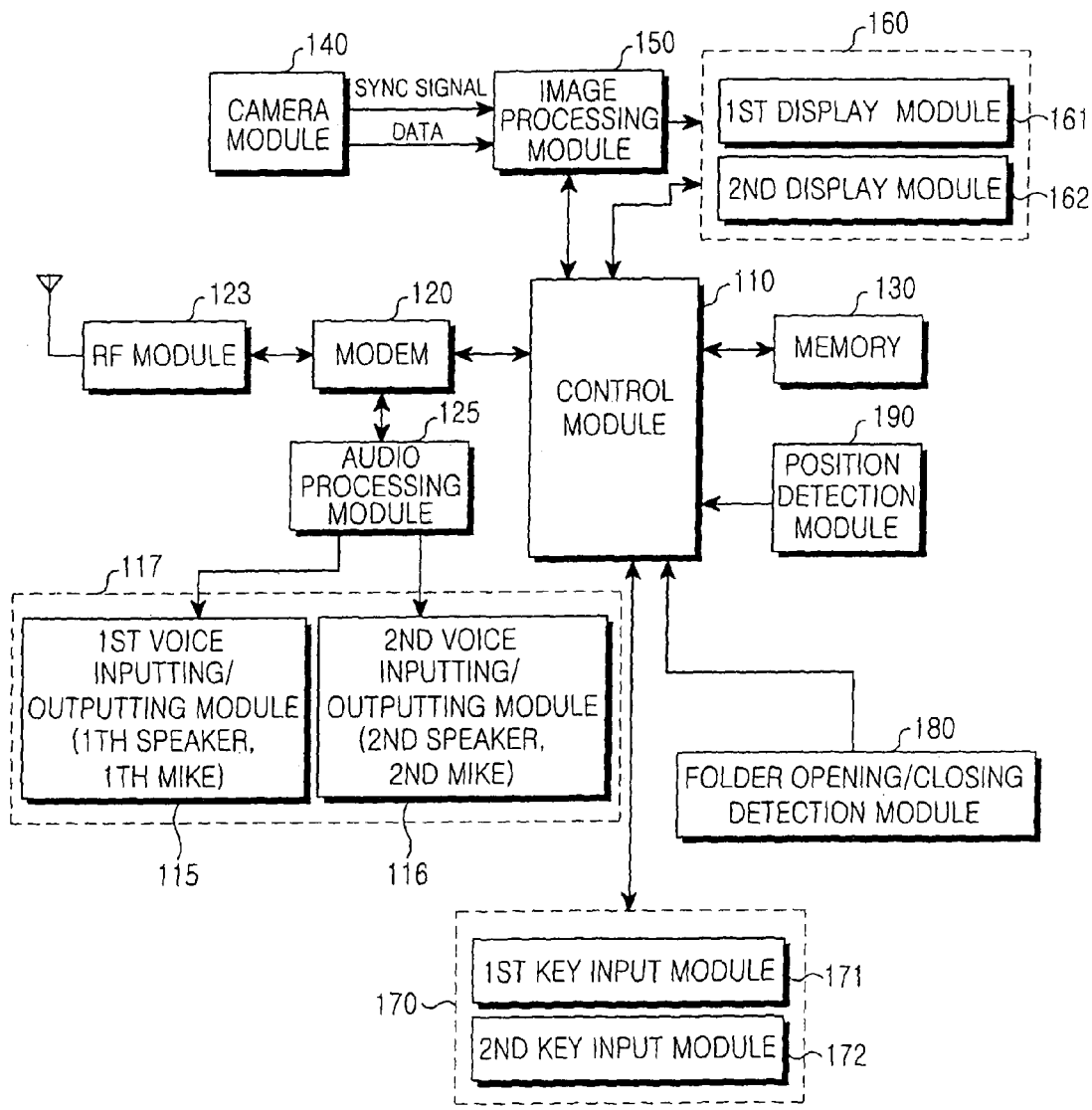
FIG. 1 is a block diagram illustrating a structure of a wireless terminal according to an embodiment of the present invention.

FIG. 1 is a block diagram illustrating a structure of a wireless terminal having a camera according to an embodiment of the present invention. In addition, the wireless terminal includes a first folder housing and a second folder housing which pivot away from a body housing in different directions when they are opened.

Referring to FIG. 1, a (radio frequency) RF module 123 performs a wireless communication function of a wireless terminal. The RF module 123 includes an RF transmitter (not transmitting) for up-converting and amplifying a frequency of a transmitted signal and an RF receiver (not transmitting) for low noise amplifying a received signal and down-converting a frequency of the received signal. A modem 120 includes a transmitter (not transmitting) for encoding and modulating the transmitted signal and a receiver (not transmitting) for decoding and demodulating the received signal.

An audio processing module 125 may comprise a codec, and the codec includes a data codec for processing packet data and an audio codec for processing audio signals such as voice. The audio processing module 125 converts a digital audio signal received by the modem 120 into an analog signal by means of the audio codec and reproduces the analog signal through the speaker and a rotary-type speaker of the voice inputting/outputting module 117. In addition, the audio processing module 125 converts an analog audio signal generated and transmitted from the microphone of the voice inputting/outputting module 117 into a digital audio signal by means of the audio codec so as to transmit the digital audio signal to the modem 120. The codec may be a stand alone device or integrated into a control module 110.

The voice inputting/outputting module 117 includes a speaker and a microphone. The voice inputting/outputting module 117 outputs voice signals transmitted from the audio processing module 125 to the speaker, or outputs voice signals generated from the microphone to the audio processing module 125. In addition, the voice inputting/outputting module 117 according to an embodiment of the present invention comprises a first voice inputting/outputting module 115 and a second voice inputting/outputting module 116. The first voice inputting/outputting module 115 includes a first speaker and a first microphone. The second voice inputting/outputting module 116 includes a second speaker and a second microphone. According to an embodiment of the present invention, the first voice inputting/outputting module 115 is mounted on one side of the wireless terminal, and the second inputting/outputting module 116 is mounted on an opposing side of the wireless terminal. In addition, according to an embodiment of the present invention, the first and the second voice inputting/outputting modules 115 and 116 may be mounted on a first hinge and a second hinge coupling a first folder housing and a second folder housing with a body housing of the wireless terminal, respectively.

The rotary-type speaker is rotatably mounted on the folder housing of the wireless terminal according to the present invention. The rotary-type speaker includes a first rotary-type speaker 118 and a second rotary-type speaker 119 according to the present invention. The first rotary-type speaker 118 is mounted inside the first folder housing 200-1 in such a manner that it can be rotatably moved away from or close to the first folder housing 200-1. The second rotary-type speaker 119 is mounted inside the second folder housing 200-2 in such a manner that it can be rotatably moved away from or close to the second folder housing 200-2. The rotary-type speakers may include bilateral speakers and thin film speakers A memory module 130 may comprise a program memory module and data memory modules. Herein, the program memory module can store programs for controlling a general operation of the wireless terminal. In addition, according to an embodiment of the present invention, the program memory module can store programs for controlling functions of the key input module 170, the display module 160, and the rotary-type speaker of the wireless terminal according to states of the folder housings of the wireless terminal and for controlling a function of the voice inputting/outputting module of the wireless terminal according to a position of the wireless terminal. The data memory modules temporarily store data generated during execution of the programs.

The control module 110 controls an overall operation of the wireless terminal. In addition, the control module 110 may comprise the modem 120 and the codec. The control module 110 detects states of the folder housings of the wireless terminal according to an embodiment of the present invention so as to control functions of the key input module 170 and the display module 160. When reading a first folder opening/closing detection signal from a folder opening/closing detection module 180 according to an embodiment of the present invention, the control module 110 activates a first display module 161, external keys of a first key input module 171, and external keys of a second key input module 172, and deactivates a second display module 162, inner keys of the first key input module 171, and inner keys of the second key input module 172. Furthermore, when reading a second folder opening/closing detection signal from the folder opening/closing detection module 180 according to an embodiment of the present invention, the control module 110 activates the first display module 161, a first screen of the second display module 162, inner keys of the first key input module 171, and external keys of the second key input module 172, and deactivates a second screen of the second display module 162, external keys of the first key input module 171, and inner keys of the second key input module 172. In addition, when reading a third folder opening/closing detection signal from the folder opening/closing detection module 180 according to an embodiment of the present invention, the control module 110 activates the second screen of the second display module 162, the external keys of the first key input module 171, and the inner keys of the second key input module 172, and deactivates the first display module 161, the first screen of the second display module 162, the inner keys of the first key input module, and the external keys of the second key input module 172. Furthermore, when reading a forth folder opening/closing detection signal from the folder opening/closing detection module 180 according to an embodiment of the present invention, the control module 110 activates the second display module 162, the inner keys of the first key input module 171, and the inner keys of the second key input module 172, and deactivates the first display module 161, the external keys of the first key input module 171, and the external keys of the second key input module 172.

In addition, the control module 110 controls the functions of the first and the second rotary-type speakers by detecting an opening/closing state of the folder housing of the wireless terminal according to an embodiment of the present invention. In addition, the control module 110 having read the first folder opening/closing detection signal from the folder opening/closing detection module 180 according to an embodiment of the present invention controls the first and the second rotary-type speakers 118 and 119 to be deactivated. In addition, the control module 110 having read the second folder opening/closing detection signal from the folder opening/closing detection module 180 according to an embodiment of the present invention controls the first rotary-type speaker 118 to be activated and the second rotary-type speaker 119 to be deactivated. In addition, the control module 110 having read the second folder opening/closing detection signal from the folder opening/closing detection module 180 according to an embodiment of the present invention controls the first rotary-type speaker 118 (rotatably moved away from the first folder housing 200-1) to be activated and the second rotary-type speaker 119 to be deactivated. In addition, the control module 110 having read the third folder opening/closing detection signal from the folder opening/closing detection module 180 according to an embodiment of the present invention controls the first rotary-type speaker 118 to be deactivated and controls the second rotary-type speaker 119 to be activated. In addition, the control module 110 having read the third folder opening/closing detection signal from the folder opening/closing detection module 180 according to an embodiment of the present invention controls the first rotary-type speaker 118 to be deactivated and the second rotary-type speaker 119 (rotatably moved away from the second folder housing 200-2) to be activated. In addition, the control module 110 having read a fourth folder opening/closing detection signal from the folder opening/closing detection module 180 according to an embodiment of the present invention controls the first rotary-type speaker 118 and the second rotary-type speaker 119 (rotatably moved away from the first folder housing 200-1 and the second folder housing 200-2, respectively) to be activated.

The control module 110 detects a position of the wireless terminal to control the function of the voice inputting/outputting module 117 according to an embodiment of the present invention. When reading a first position signal from a position detection module 190 according to an embodiment of the present invention, the control module 110 activates a first speaker of the first voice inputting/outputting module 115 and a second microphone of the second voice inputting/outputting module 116, deactivates the first microphone of the first voice inputting/outputting module 115 and the second speaker of the second voice inputting/outputting module 116. In addition, when reading a second folder opening/closing detection signal from the position detection module 190 according to an embodiment of the present invention, the control module 110 activates the first microphone of the first voice inputting/outputting module 115 and the second speaker of the second voice inputting/outputting module 116, and deactivates the first speaker of the first voice inputting/outputting module 115 and the second microphone of the second voice inputting/outputting module 116.

A camera module 140 photographs an image, and comprises a camera sensor (not shown) for converting an optical signal of the photographed image into an electrical signal and a signal processing module (not shown) for converting an analog image signal output from the camera sensor into digital data. Herein, on the assumption that the camera sensor is a Charge Coupled Device (CCD) sensor, the signal processing module can be realized by means of a digital signal processor (DSP). In addition, the camera sensor may be a stand alone device or integrated with the signal processing module.

An image processing module 150 generates image data for displaying the image output from the camera module 140. The image processing module 150 processes the image output from the camera module 140 according to frames, and outputs the image according to frames in match with the characteristic and the size of the display module 160. In addition, the image processing module 150 includes an image codec so as to compress a frame image displayed on the display module 160 through a predetermined image compressing scheme or decompress the compressed frame image into an original frame data. Herein, the image codec may include a Joint Picture Experts Group (JPEG) codec, an Moving Picture Experts Group 4 (MPEG4) codec, and Wavelet codec. On the assumption that the image processing module 150 has an OSD (on screen display) function, the image processing module 150 can output OSD data according to the size of an image displayed under the control of the control module 110.

A display module 160 displays the image signal output from the image processing module 150 on a screen and user data output from the control module 110. Herein, the display module 160 may employ a Liquid Crystal Display (LCD). In this case, the display module 160 may comprise a LCD controller, a memory capable of storing image data, and an LCD display element. Herein, if the LCD is realized through a touch screen scheme, the display module 160 may operate as an input module. In addition, if the display module 160 has a first display module 161 included in the folder housings of the wireless terminal and a second display module 162 included in a body housing of the wireless terminal, the second display module 162 may include a first screen and a second screen. The first screen is a screen of the second display module 162 for displaying data when the second folder housing of the wireless terminal is closed, and the second screen is a screen of the second display module 162 for displaying data when the first folder housing of the wireless terminal is closed.

The key input module 170 includes keys for inputting numeric and letter information and function keys for setting various functions. In addition, the key input module 170 has a first key input module 171 included in the first folder housing and a second key input module 172 included in the second folder housing according to an embodiment of the present invention. The first key input module 171 has inner keys included in the inner side of the first folder housing and external keys included in the outer side of the first folder housing. The second key input module 172 has inner keys included in the inner side of the second folder housing and external keys included in the outer side of the second folder housing.

The inner keys and the outer keys of the first key input module 171 may be realized as alphanumeric keys for inputting numeric information and letter information, and the inner keys and the outer keys of the second key input module 172 may be realized as function keys for setting various functions. In addition, the inner keys and the outer keys of the first key input module 171 may be realized as the function keys and the inner keys and the outer keys of the second key input module 172 may be realized as the numeral keys. The inner keys of the first key input module 171 may be realized as the function keys, and the outer keys of the first key input module 171 may be realized as the numeral keys. In addition, the inner keys of the second inputting module 172 may be realized as the function keys, and the outer keys of the second key input module 172 may be realized as the numeral keys. In addition, the inner keys of the first key input module 171 may be realized as the numeral keys, and the outer keys of the first key input module 171 may be realized as the function keys. The inner keys of the second key input module 172 may be realized as the numeral keys, and the external keys of the second key input module 172 may be realized as the function keys.

The folder opening/closing detection module 180 detects the states of the folder housings of the wireless terminal and outputs folder opening/closing detection signals to the control module 110. In other words, the folder opening/closing detection module 180 detects the folder opening/closing detection signals according to the states of the folder housings of the wireless terminal and outputs the folder opening/closing detection signals to the control module 110. Herein, the folder opening/closing detection module 180 may be realized in various ways. For example, it is assumed that, according to an embodiment of the present invention, the folder opening/closing detection module 180 comprises sensors (making contact with the first folder housing and the second folder housing when they are closed) disposed in the body housing of the wireless terminal and magnets fixed to the first folder housing and the second folder housing of the wireless terminal, respectively, thereby detecting four folder opening/closing states of the folder housings caused by the magnets detected by the sensors. In addition, it is assumed that the folder opening/closing sensors are hall effect ICs. The locations and the number of the sensors and the magnets, which have been optionally selected in the above-described embodiment, are not fixed but may change according to the type of portable terminals used.

Figure 2A:
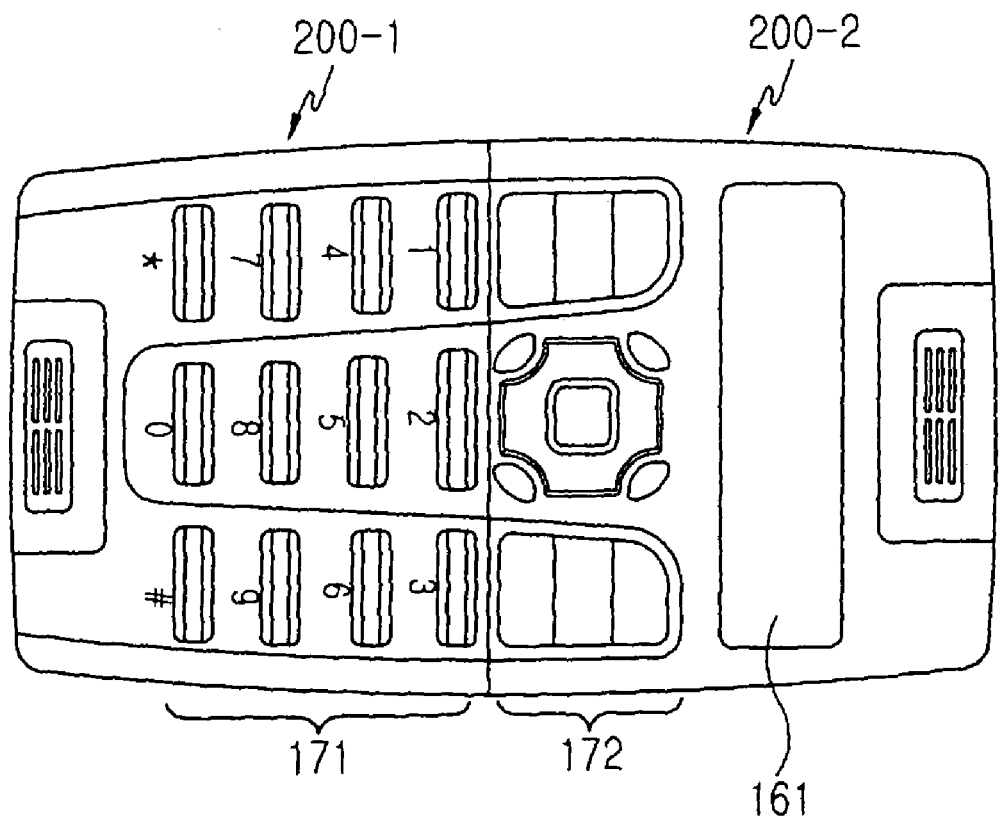
FIGS. 2A to 2D are views for illustrating an operation of a wireless terminal according to folder opening/closing detection signals in the wireless terminal according to an embodiment of the present invention.
Figure 2B:
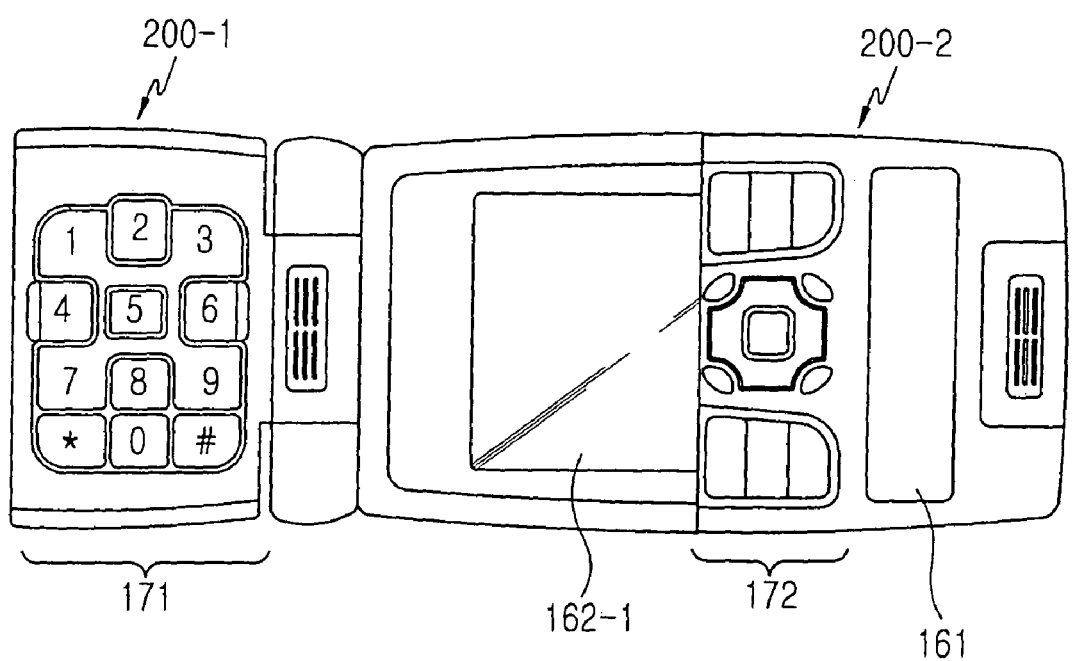
Figure 2C:
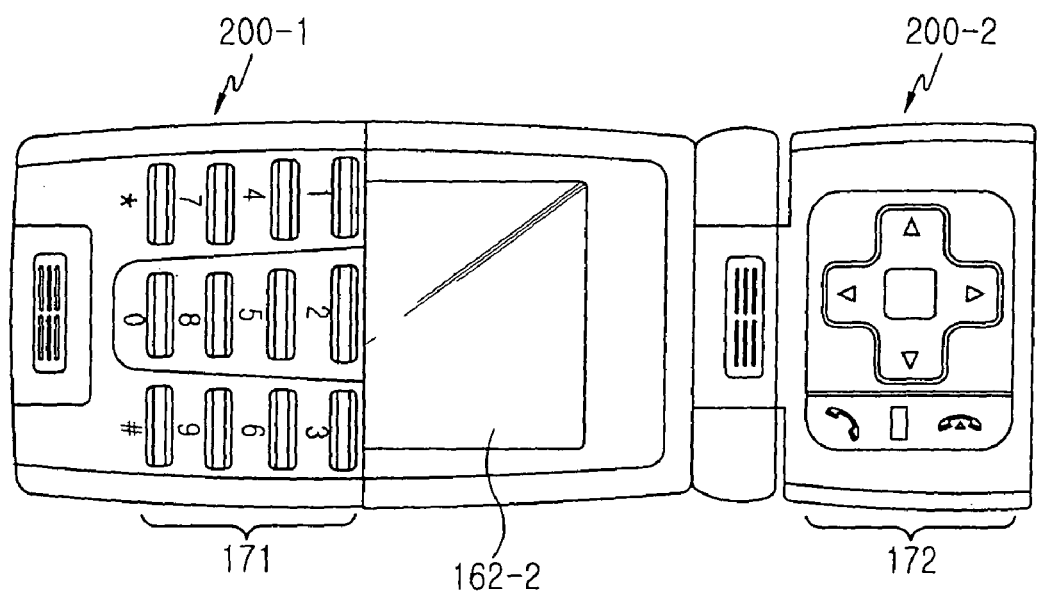
Figure 2D:
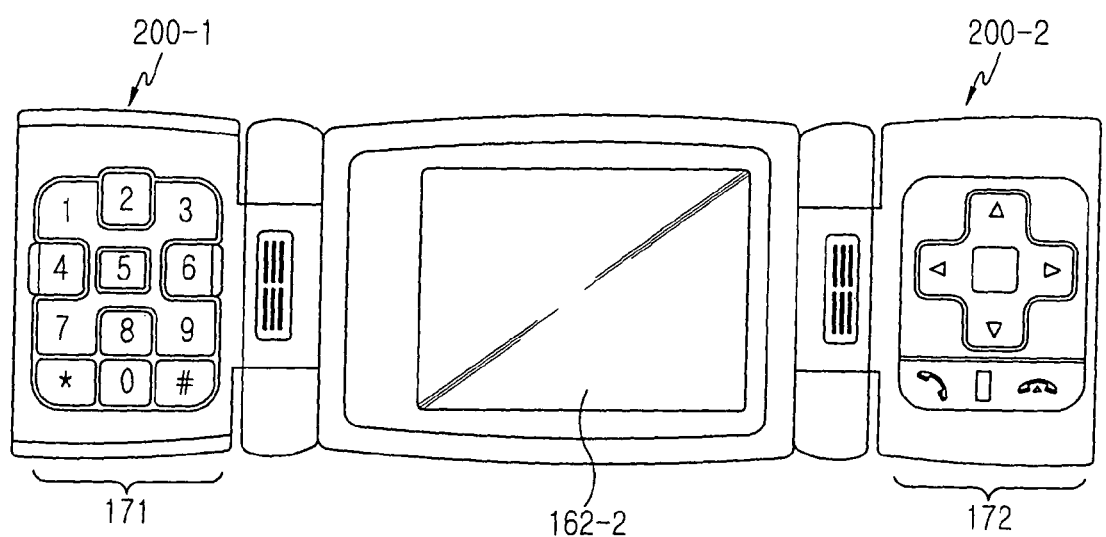

Hereinafter, four folder opening/closing detection signals detected by the folder opening/closing detection module 180 will be described with reference to FIGS. 2A to 2D. FIG. 2A shows a first folder opening/closing state in which both the first folder housing 200-1 and the second folder housing 200-2 are closed. FIG. 2B shows a second folder opening/closing state in which the first folder housing 200-1 is opened and the second folder housing 200-2 is closed. FIG. 2C shows a third folder opening/closing state in which the first folder housing 200-1 is closed and the second folder housing 200-2 is opened. FIG. 2D shows a fourth folder opening/closing state in which both the first folder housing 200-1 and the second folder housing 200-2 are opened.

In the first folder opening/closing state shown in FIG. 2A, if the sensor (not shown) disposed in the body housing of the wireless terminal, which makes contact with the first folder housing, detects the magnet included in the first folder housing, and if the sensor (not shown) disposed in the body housing of the wireless terminal, which makes contact with the second folder housing, detects the magnet (not shown) included in the second folder housing, the folder opening/closing detection module 180 generates a first folder opening/closing detection signal.

In the second folder opening/closing state shown in FIG. 2B, if the sensor (not shown) disposed in the body housing of the wireless terminal, which makes contact with the second folder housing, detects the magnet (not shown) disposed in the second folder housing, the folder opening/closing detection module 180 generates a second folder opening/closing detection signal.

In the third folder opening/closing state shown in FIG. 2C, if the sensor (not shown) disposed in the body housing of the wireless terminal, which makes contact with the first folder housing, detects the magnet (not shown) included in the first folder housing, the folder opening/closing detection module 180 generates a third folder opening/closing detection signal.

In the fourth folder opening/closing state shown in FIG. 2D, if the sensor (not shown) disposed in the body housing of the wireless terminal, which makes contact with the first folder housing, does not detect the magnet included in the first folder housing, and if the sensor (not shown) disposed in the body housing of the wireless terminal, which makes contact with the second folder housing, does not detect the magnet (not shown) disposed in the second folder housing, the folder opening/closing detection module 180 generates a fourth folder opening/closing detection signal.

The position detection module 190 detects a position of the wireless terminal and outputs a position detection signal to the control module 110. Specifically, the position detection module 190 detects position detection signals according to positions of the wireless terminal so as to output the position detection signals to the control module 110. Herein, according to an embodiment of the present invention, it is assumed that the position detection module 190 is a two-axis acceleration sensor capable of detecting an X axis and a Y axis.

Figure 6A:
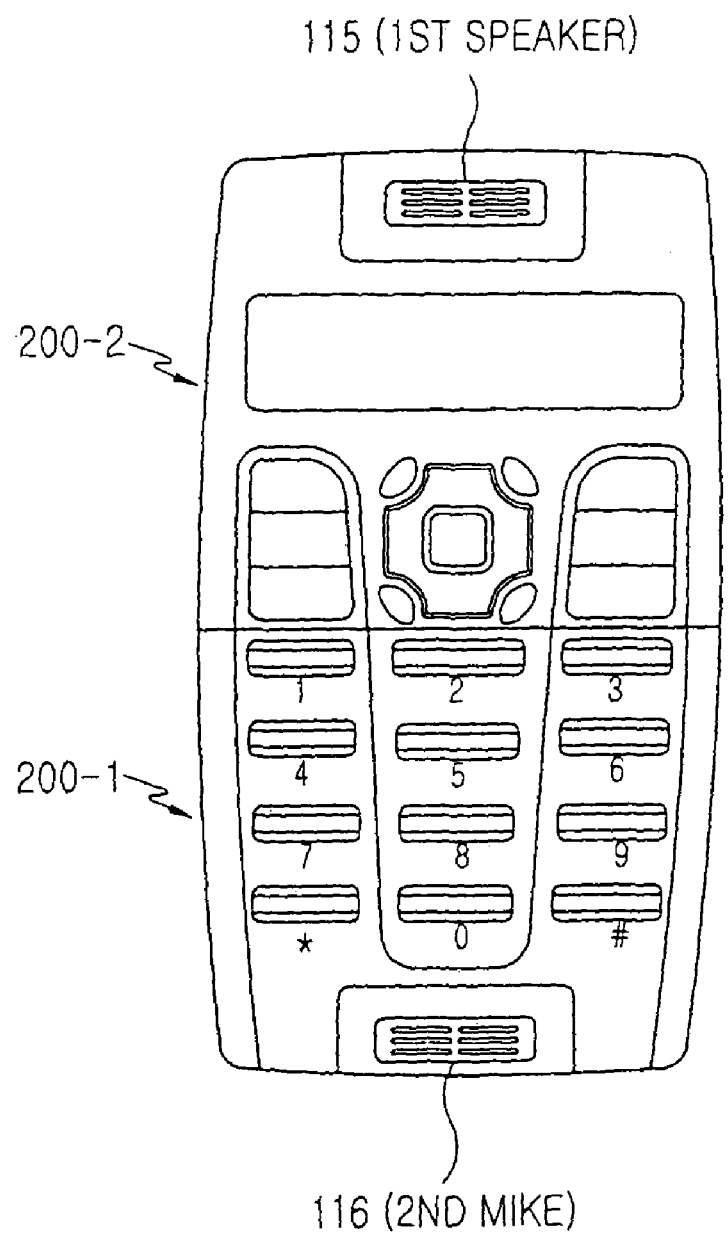
FIGS. 6A and 6B are views illustrating an operation of a wireless terminal according to position detection signals in a first folder opening/closing state of the wireless terminal according to an embodiment of the present invention.
Figure 6B:
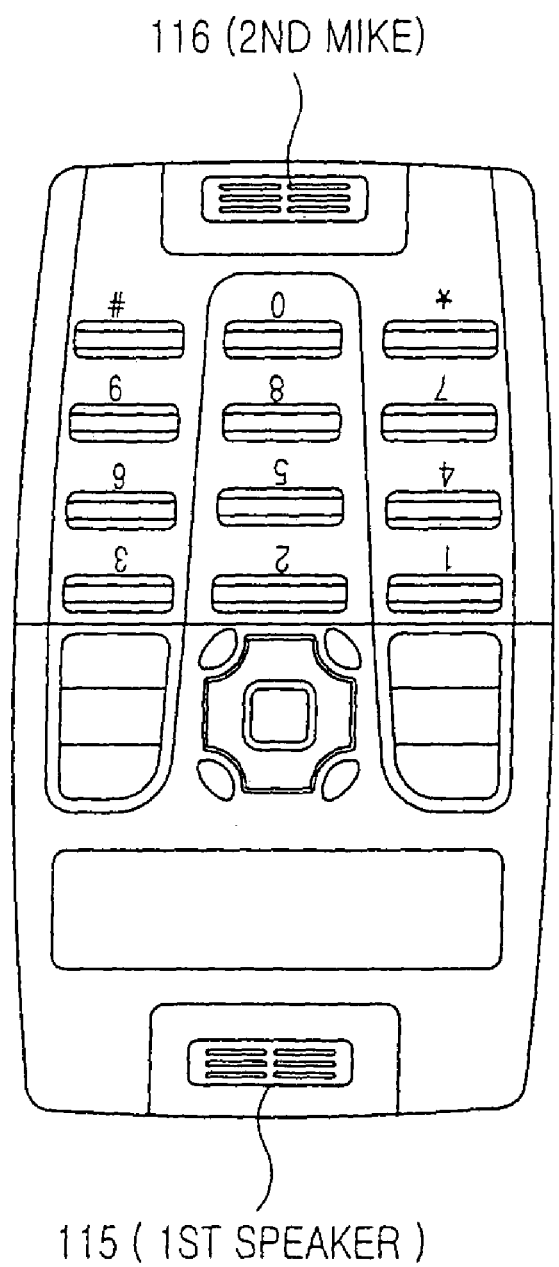
Figure 7A:
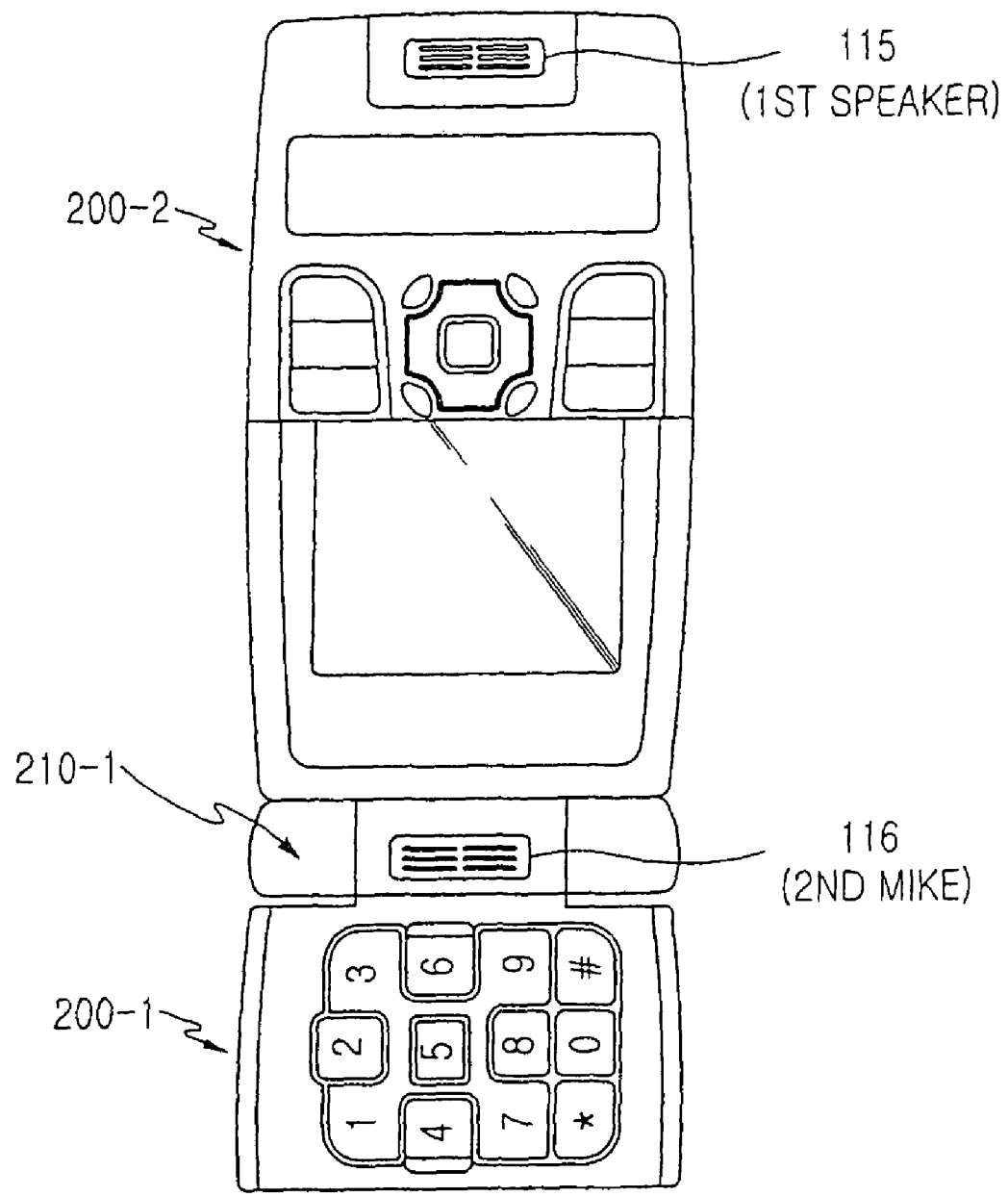
FIGS. 7A and 7B are views illustrating an operation of a wireless terminal according to position detection signals in a second folder opening/closing state of the wireless terminal according to an embodiment of the present invention.
Figure 7B:
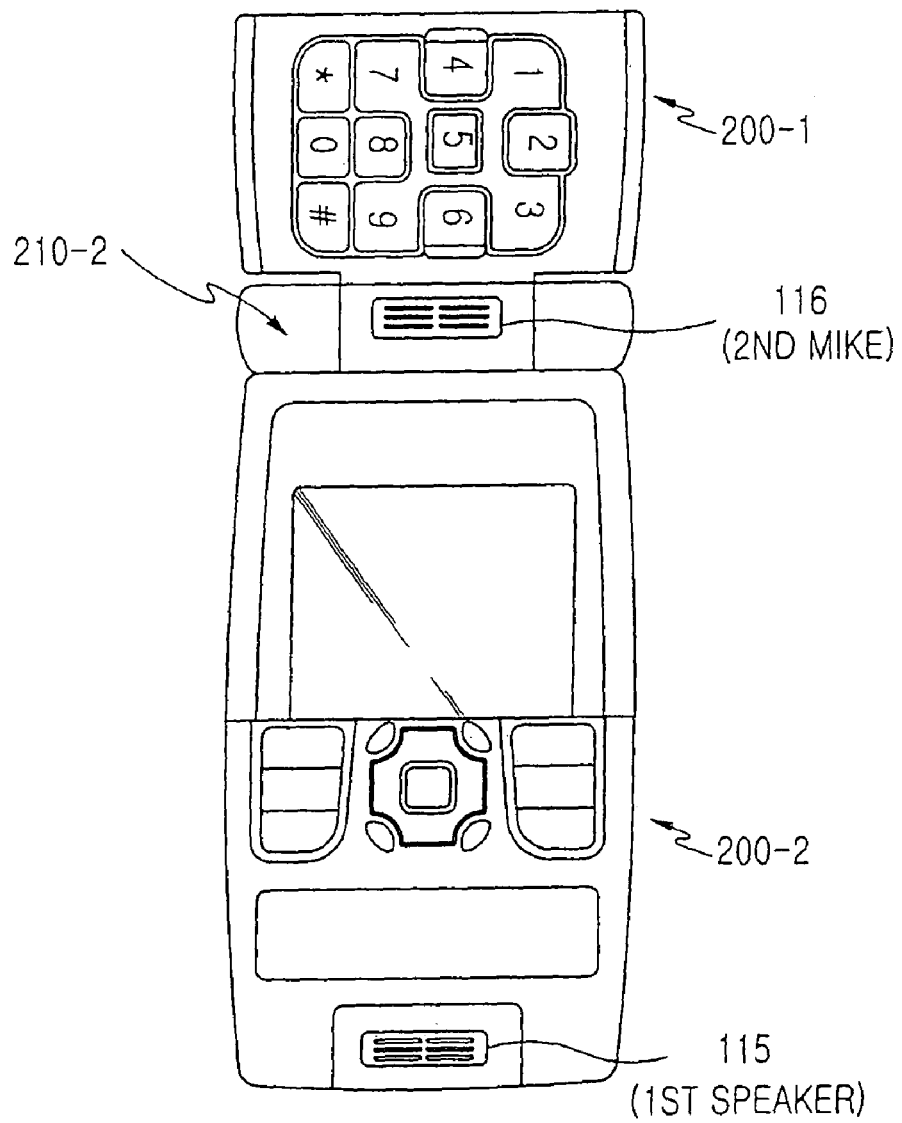
Figure 8A:
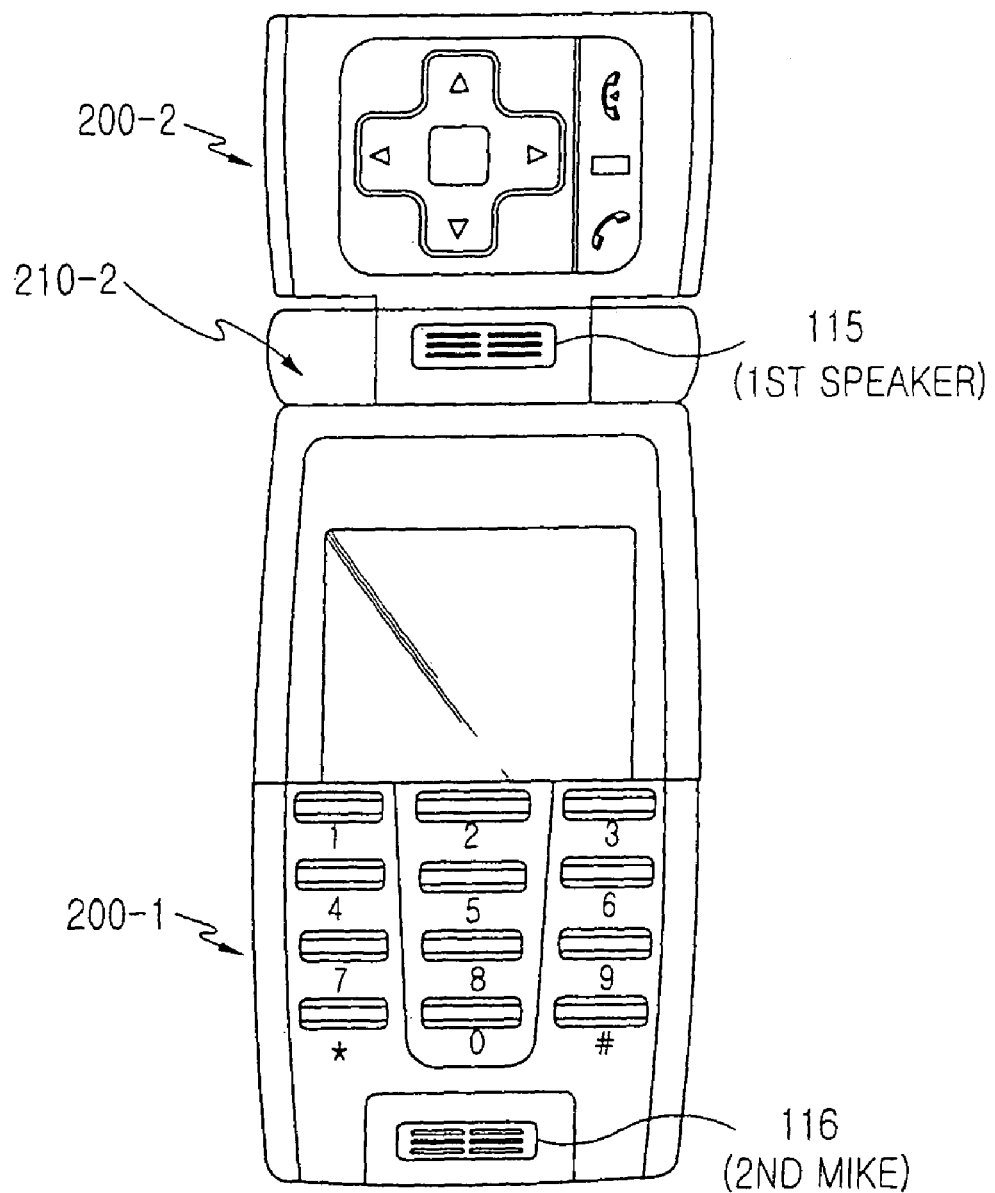
FIGS. 8A and 8B are views illustrating an operation of a wireless terminal according to position detection signals in a third folder opening/closing state of the wireless terminal according to an embodiment of the present invention.
Figure 8B:
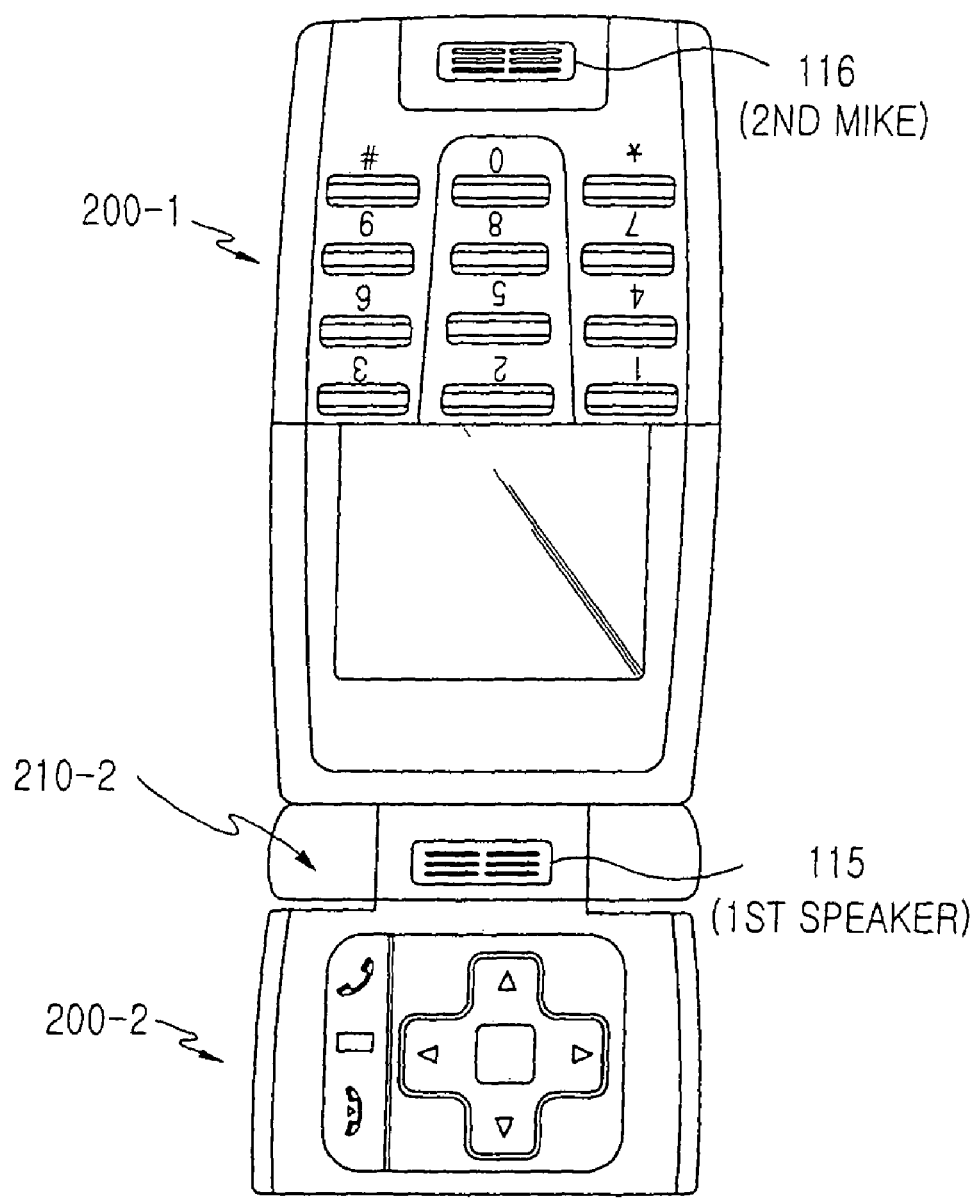
Figure 9A:
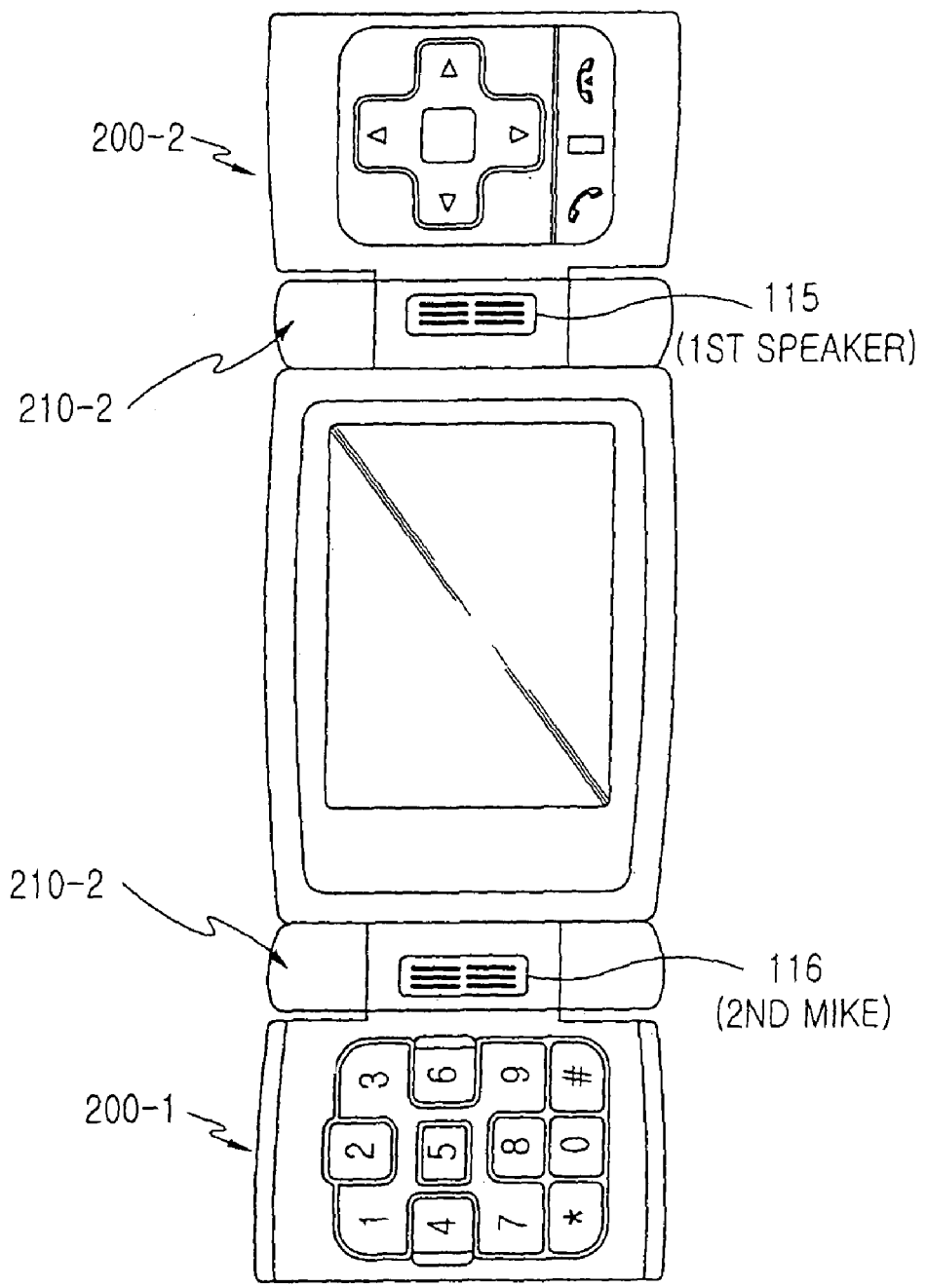
FIGS. 9A and 9B are views illustrating an operation of a wireless terminal according to position detection signals in a fourth folder opening/closing state of the wireless terminal according to an embodiment of the present invention.
Figure 9B:
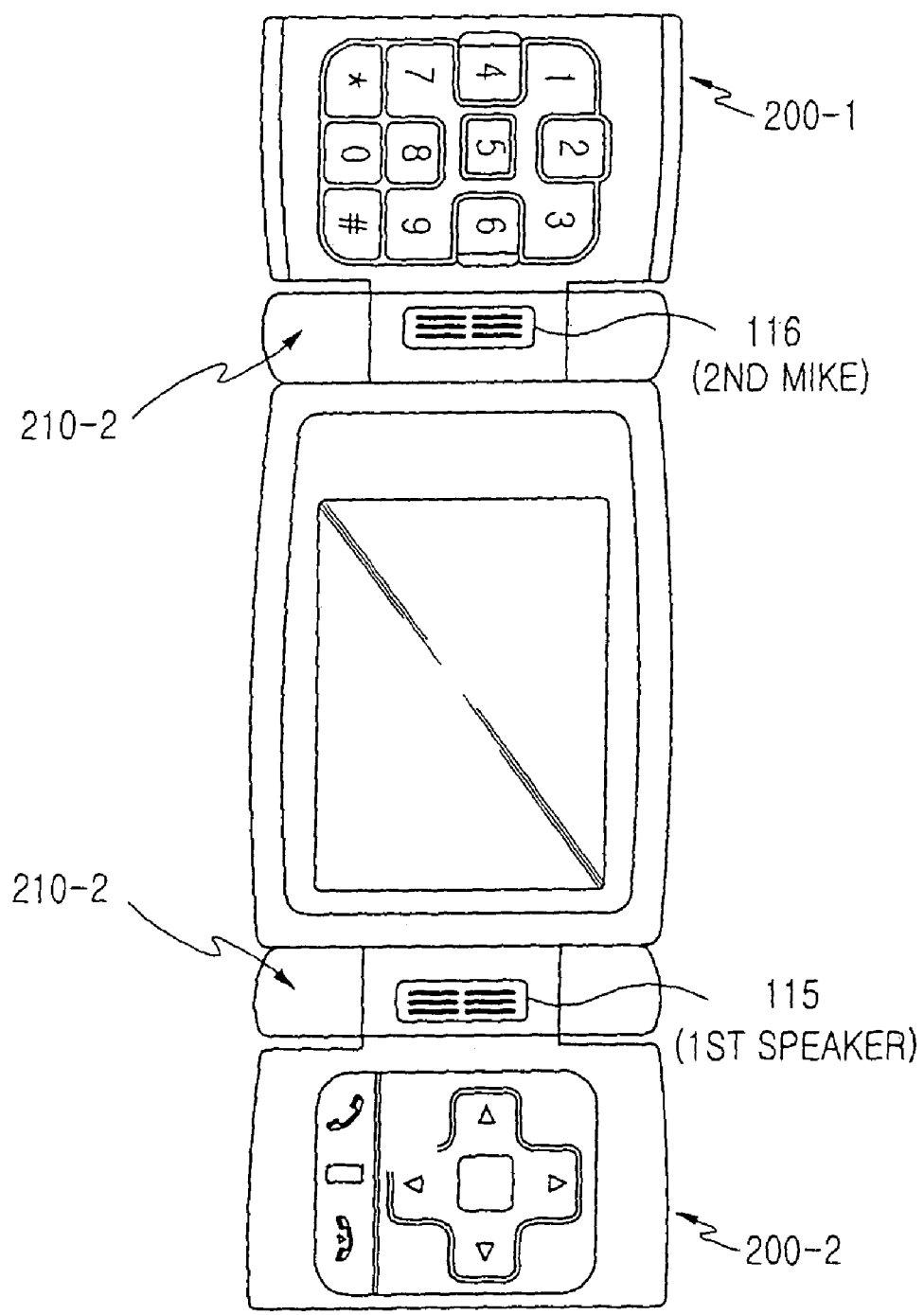

Hereinafter, two position detection signals detected by the position detection module 190 will be described with reference to FIGS. 6A to 9B. FIGS. 6A and 6B are views illustrating an operation of the wireless terminal according to the position detection signals in the first folder opening/closing state. FIG. 6A shows a first position state in the first folder opening/closing state of the wireless terminal, and FIG. 6B shows a second position state in the first folder opening/closing state. Herein, the first position state refers to a state in which the wireless terminal stands upright, and the second position state refers to a state in which the wireless terminal has been rotated 180° from the first position state. FIGS. 7A and 7B are views illustrating an operation of the wireless terminal according to the position detection signals in the second folder opening/closing state. FIG. 7A shows the first position state in the second folder opening/closing state of the wireless terminal, and FIG. 7B shows the second position state in the second folder opening/closing state. FIGS. 8A and 8B are views illustrating an operation of the wireless terminal according to the position detection signals in the third folder opening/closing state. FIG. 8A shows the first position state in the third folder opening/closing state of the wireless terminal, and FIG. 8B shows the second position state in the third folder opening/closing state. FIGS. 9A and 9B are views illustrating an operation of the wireless terminal according to the position detection signals in the fourth folder opening/closing state. FIG. 9A shows the first position state in the fourth folder opening/closing state of the wireless terminal, and FIG. 9B shows the second position state in the fourth folder opening/closing state.

If the wireless terminal is in an upright position as shown in FIGS. 6A, 7A, 8A, and 9A, the position detection module 190 generates the first position detection signal.

In addition, if the wireless terminal has been rotated 180° as shown in FIGS. 6B, 7B, 8B, and 9B, the position detection module 190 generates the second position detection signal.

Figure 3:
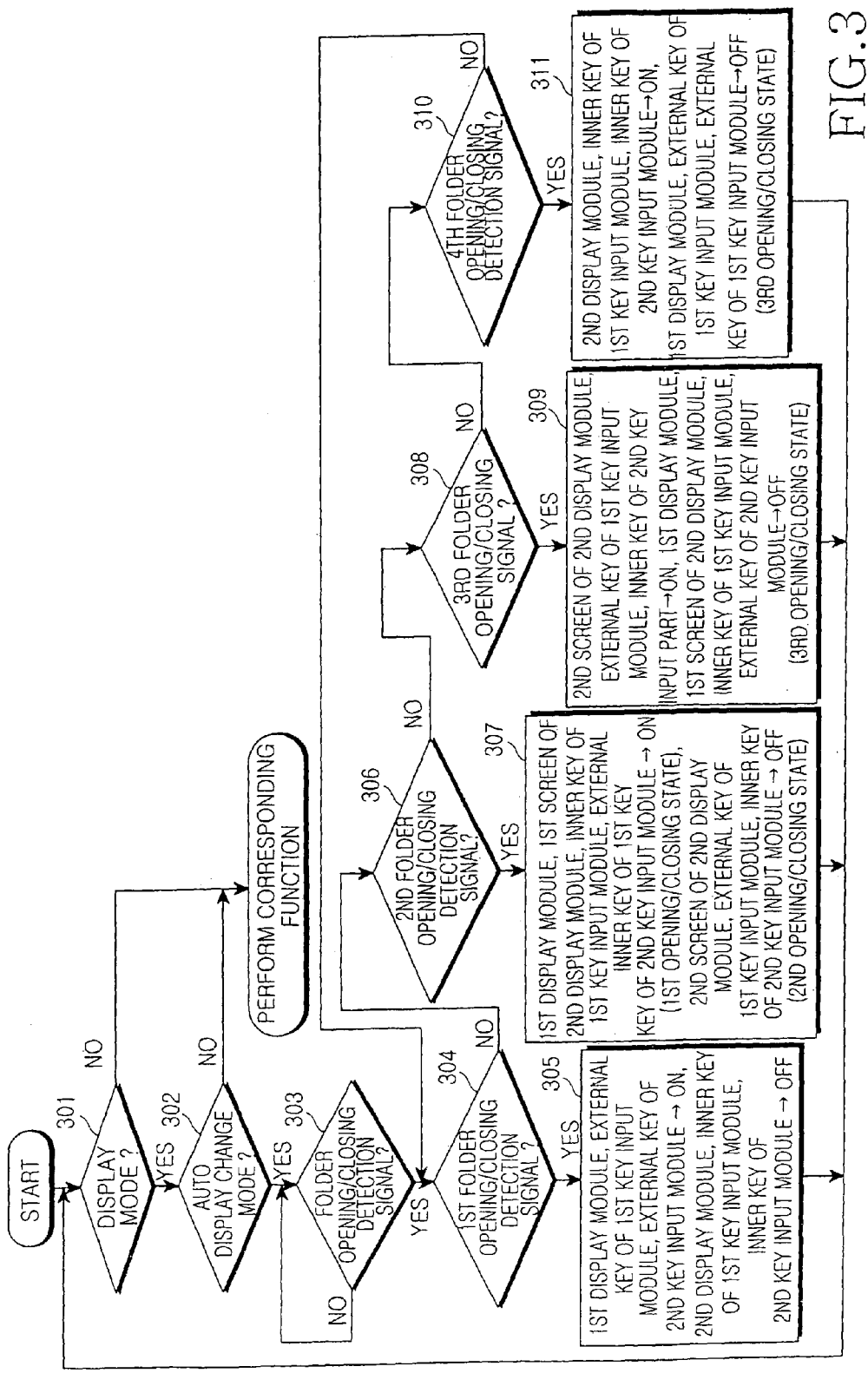
FIG. 3 is a flowchart illustrating a method for controlling a key input module and a display module according to folder opening/closing detection signals in a wireless terminal according to an embodiment of the present invention.

FIG. 3 is a flowchart illustrating a method for controlling functions of the display module and the key input modules in the wireless terminal according to an embodiment of the present invention. Specifically, a method for controlling the functions of the display module 160 and the key input module 170 in the wireless terminal including the folder opening/closing detection module 180 shown in FIGS. 2A to 2D will be described below with reference to FIG. 3. According to an embodiment of the present invention, it is assumed that the inner keys and the external keys of the first key input module 171 are realized as alphanumeric keys for inputting numeral information and letter information. In addition, it is assumed that the inner keys and the external keys of the second key input module 172 are realized as function keys for setting various functions.

Referring to FIG. 3, the control module 110 determines whether or not the current mode is a display mode in step 301. Herein, the display mode refers to a mode in which an image is displayed on the first display module 161 due to contact of the body housing and the folder housings in the wireless terminal. In addition, the display mode refers to a mode in which an image is displayed on the second display module 162 due to separation between the body housing and the folder housings in the wireless terminal. If an automatic display change mode is set in the display mode described above, the control module 110 detects the automatic display change mode in step 302. Herein, the automatic display change mode refers to a mode in which the functions of the display module 160 and the key input module 170 are controlled according to the folder opening/closing detection signals of the folder opening/closing detection module 180. Accordingly, if the automatic display change mode is not set, the control module 110 allows the display module 160 and the key input module 170 to perform their general functions regardless of an output of the folder opening/closing detection module 180. However, if the automatic display change mode is set, the control module 110 determines whether the folder opening/closing detection signals are output from the folder opening/closing detection module 180. If the folder opening/closing detection signals are output from the folder opening/closing detection module 180, the control module 110 detects the output of the folder opening/closing detection signals in step 303 and reads the folder opening/closing detection signals output from the folder opening/closing detection module 180.

At this time, if the sensor (not shown) included in the body housing of the wireless terminal, which makes contact with the first folder housing 200-1 of the wireless terminal, detects the magnet included in the first folder housing 200-1, and if the sensor (not shown) disposed in the body housing of the wireless terminal, which makes contact with the second folder housing 200-2, detects the magnet (not shown) disposed in the second folder housing 200-2, the folder opening/closing detection module 180 recognizes this and generates the first folder opening/closing detection signal in step 304. In addition, the control module 110 reads the first folder opening/closing detection signal from the folder opening/closing detection module 180. If the first folder opening/closing detection signal is generated as described above, the control module 110 activates the first display module 161, the numeral keys of the first key input module 171, and the external keys of the second key input module 172 in step 305.

In addition, the control module 110 deactivates the second display module 162, the inner keys of the first key input module 171, and the inner keys of the second key input module 172 in step 305. FIG. 2a shows a state in which the first folder housing 200-1 and the second folder housing 200-2 of the wireless terminal are closed.

However, if the sensor (not shown) included in the body housing of the wireless terminal, which makes contact with the first folder housing 200-1, does not detect the magnet (not shown) disposed in the first folder housing 200-1, and if the sensor (not shown) disposed in the body housing of the wireless terminal, which makes contact with the second folder housing 200-2, detects the magnet disposed in the second folder housing 200-2, the folder opening/closing detection module 180 detects this and generates the second folder opening/closing signal in step 306. In addition, the control module 110 reads the second folder opening/closing detection signal from the folder opening/closing detection module 180. If the second folder opening/closing detection signal is generated as described above, the control module 110 activates the first display module 161, the first screen 162-1 of the second display module, the inner keys of the first key input module 171, and the external keys of the second key input module 172 in step 307. In addition, the control module 110 deactivates the second display screen 162-2 of the second display module, the external keys of the first key input module 171, and the inner keys of the second key input module 172 in step 307. FIG. 2B shows a state in which the first folder housing 200-1 is opened and the second folder housing 200-2 is closed.

In addition, if the sensor (not shown) included in the body housing of the wireless terminal, which makes contact with the first folder housing 200-1, detects the magnet (not shown) included in the first folder housing 200-1, and if the sensor (not shown) included in the body housing of the wireless terminal, which makes contact with the second folder housing 200-2, does not detect the magnet included in the second folder housing 200-2, the folder opening/closing detection module 180 detects this and generates the third folder opening/closing signal in step 308. In addition, the control module 110 reads the third folder opening/closing detection signal from the folder opening/closing detection module 180. If the third folder opening/closing detection signal is generated as described above, the control module 110 activates the second screen 162-2 of the second display module 162, the external keys of the first key input module 171, and the inner keys of the second key input module 172 in step 309. In addition, the control module 110 deactivates the first display module 161, the first display screen 162-2 of the second display module 162, the inner keys of the first key input module 171, and the external keys of the second key input module 172 in step 309. FIG. 2C shows a state in which the first folder housing 200-1 is closed and the second folder housing 200-2 is opened.

Finally, if the sensor (not shown) disposed in the body housing of the wireless terminal, which makes contact with the first folder housing 200-1, does not detect the magnet (not shown) disposed in the first folder housing 200-1, and if the sensor (not shown) disposed in the body housing of the wireless terminal, which makes contact with the second folder housing 200-2, does not detect the magnet disposed in the second folder housing 200-2, the folder opening/closing detection module 180 detects this and generates the fourth folder opening/closing signal in step 310. In addition, the control module 110 reads the fourth folder opening/closing detection signal from the folder opening/closing detection module 180. If the fourth folder opening/closing detection signal is generated as described above, the control module 110 activates the second display module 162, the inner keys of the first key input module 171, and the inner keys of the second key input module 172 in step 311. In addition, the control module 110 deactivates the first display module 161, the external keys of the first key input module 171, and the external keys of the second key input module 172 in step 311. FIG. 2D shows a state in which the first folder housing 200-1 and the second folder housing 200-2 are closed.

Figure 4A:
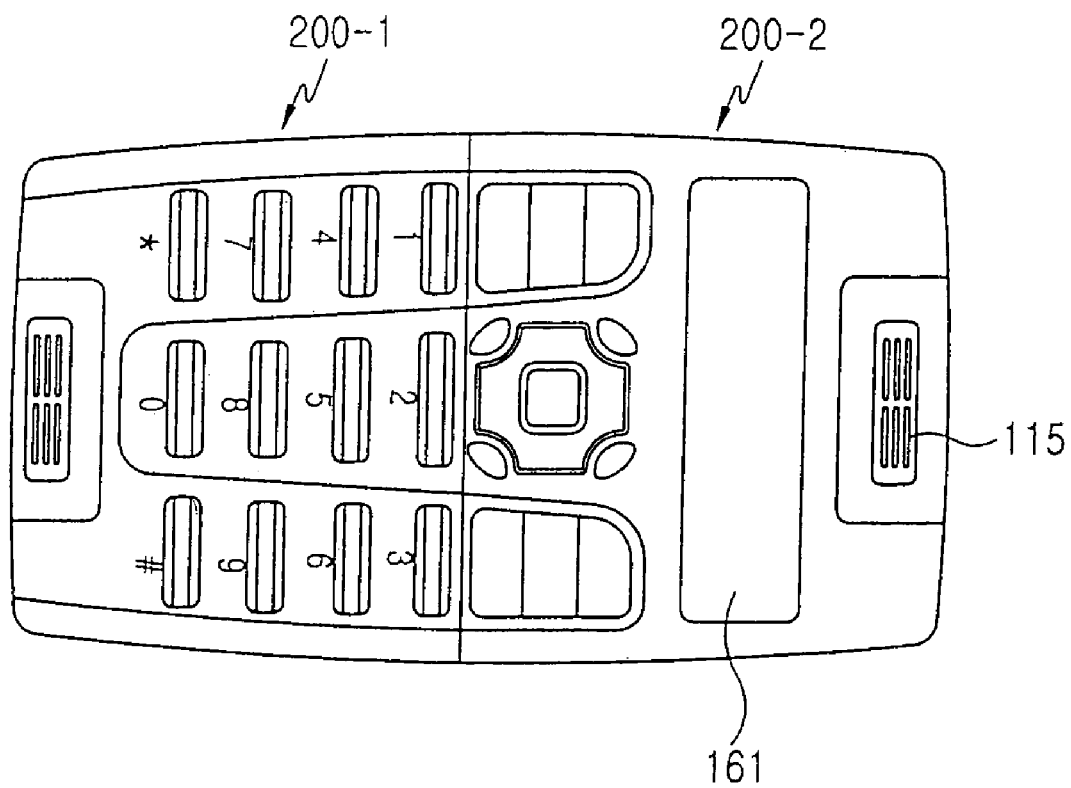
FIGS. 4A to 4D are views for explaining an operation of a rotary-type speaker according to folder opening/closing detection signals in a wireless terminal according to an embodiment of the present invention.
Figure 4B:
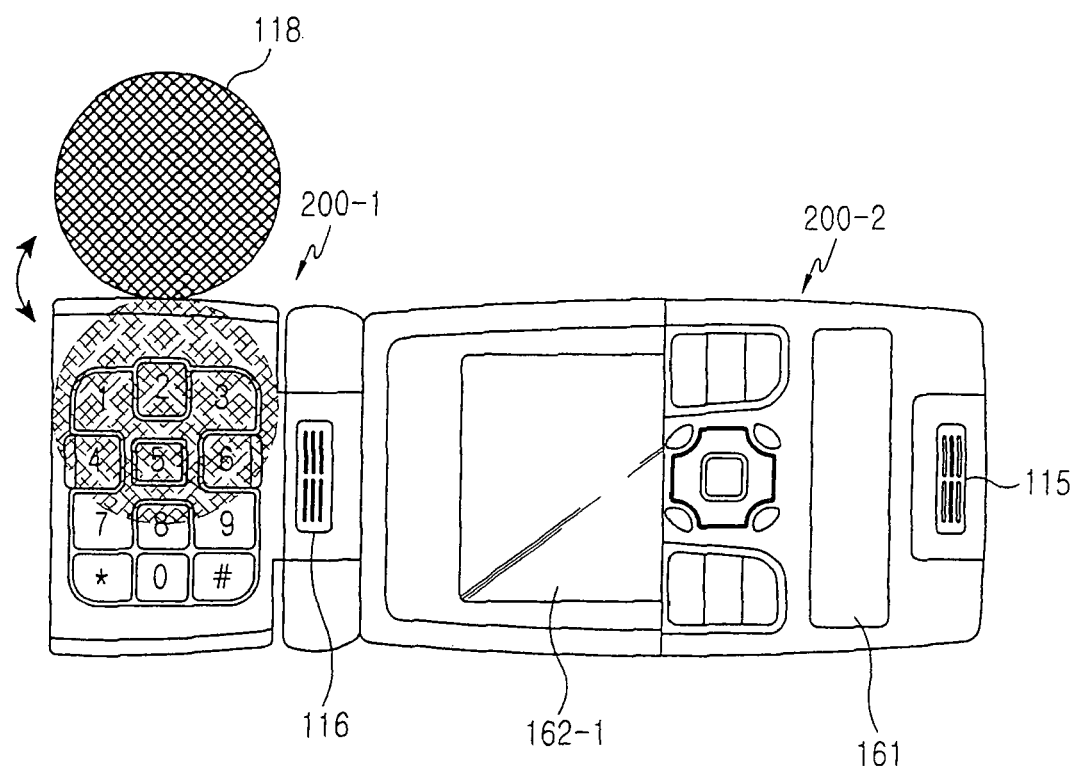
Figure 5:
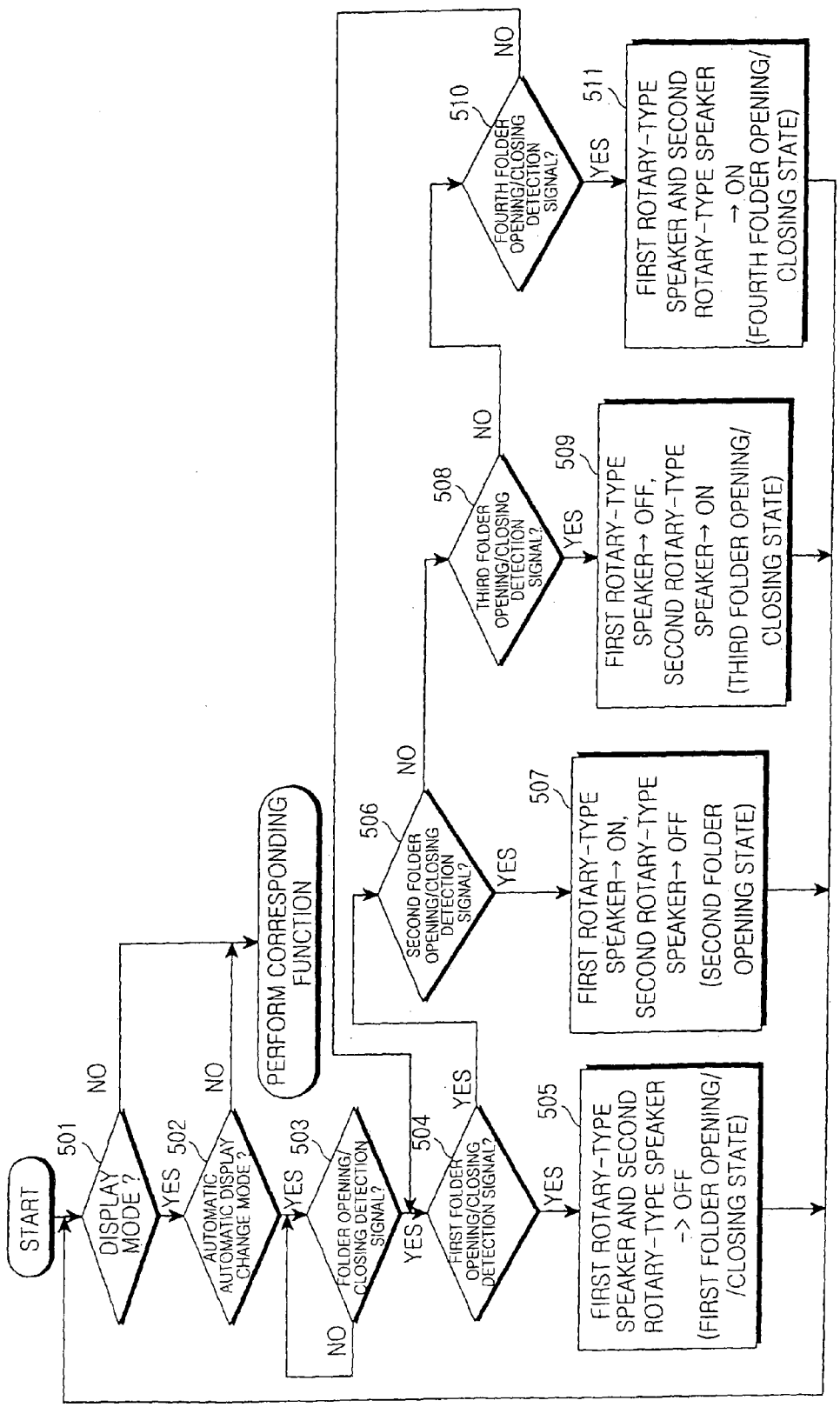
FIG. 5 is a flowchart illustrating a method for controlling a rotary-type speaker according to folder opening/closing detection signals in a wireless terminal according to an embodiment of the present invention.

FIG. 5 is a flowchart illustrating a method for controlling the rotary-type speakers in the wireless terminal according to an embodiment of the present invention. Hereinafter, the method for controlling the rotary-type speakers in the wireless terminal including the folder opening/closing detection module 180 shown in FIGS. 4A and 4B will be described with reference to FIG. 5. A rotary-type speaker according to an embodiment of the present invention includes a first rotary-type speaker and a second rotary-type speaker mounted inside the first folder and the second folder, respectively. In addition, it is assumed that the first rotary-type speaker and the second rotary-type speaker are rotatably moved away from the first folder and the second folder, respectively, or rotatably close to the first folder and the second folder, respectively.

Referring to FIG. 5, in step 501, the control module 110 determines if a current mode is a display mode. Herein, the display mode denotes a mode in which the body housing of the wireless terminal makes contact with the folder housing, thereby displaying an image on the first display module 161 and the body housing of the wireless terminal pivots away from the folder housing, thereby displaying an image on the second display module 162. When an automatic display change mode is set up in the display mode described above, the control module 110 detects the set up of the automatic display change mode in step 502. Herein, the automatic display change mode denotes a mode in which the functions of the first and the second rotary-type speakers 118 and 119 are controlled according to a folder opening/closing detection signal of the folder opening/closing detection module 180. Accordingly, if the automatic display change mode is not set up, the control module 110 performs typical functions for the first rotary-type speaker 118 and the second rotary-type speaker 119 regardless of the output of the folder opening/closing detection module 180. However, if the automatic display change mode is set up, the control module 110 determines if a folder opening/closing detection signal is output from the folder opening/closing detection module 180. If the folder opening/closing detection signal is output from the folder opening/closing detection module 180, the control module 110 detects the folder opening/closing detection signal and reads the folder opening/closing detection signal output from the folder opening/closing detection module 180 in step 503.

Herein, if a sensor (not shown) included in the body housing of the wireless terminal (making contacts with the first folder housing 200-1 of the wireless terminal) detects a magnet (not shown) included in the first folder housing 200-1, and if a sensor (not shown) included in the body housing of the wireless terminal (making contacts with the second folder housing 200-2) detects a magnet (not shown) included in the second folder housing 200-2, the folder opening/closing detection module 180 recognizes the detection so as to generate the first folder opening/closing detection signal in step 504. In addition, the control module 110 reads the first opening/closing detection signal from the folder opening/closing detection module 180. If the first folder opening/closing detection signal is generated as described above, the control module 110 controls the first rotary-type speaker 118 and the second rotary-type speaker 119 to be deactivated in step 505.

FIG. 4A illustrates the first folder housing 200-1 and the second folder housing 200-2 of the wireless terminal in the close state.

However, if the sensor (not shown) included in the body housing of the wireless terminal (making contacts with the first folder housing 200-1 of the wireless terminal) does not detect a magnet (not shown) included in the first folder housing 200-1, and if the sensor (not shown) included in the body housing of the wireless terminal (making contacts with the second folder housing 200-2) detects a magnet (not shown) included in the second folder housing 200-2, the folder opening/closing detection module 180 recognizes the detection so as to generate the second folder opening/closing detection signal in step 506. In addition, the control module 110 reads the second opening/closing detection signal from the folder opening/closing detection module 180. If the second folder opening/closing detection signal is generated as described above, the control module 110 controls the first rotary-type speaker 118 to be activated and the second rotary-type speaker 119 to be deactivated in step 507. Herein, the control module 110 detects the rotation state of the first rotary-type speaker 118 and may control the first rotary-type speaker to be activated only when the first rotary-type speaker 118 is rotatably moved away from the first folder housing 200-1. In addition, the second speaker of the second voice inputting/outputting module 116 may be activated together with the first rotary-type speaker. FIG. 4B illustrates the first folder housing 200-1 in the open state and the second folder housing 200-2 in the close state.

Figure 4C:
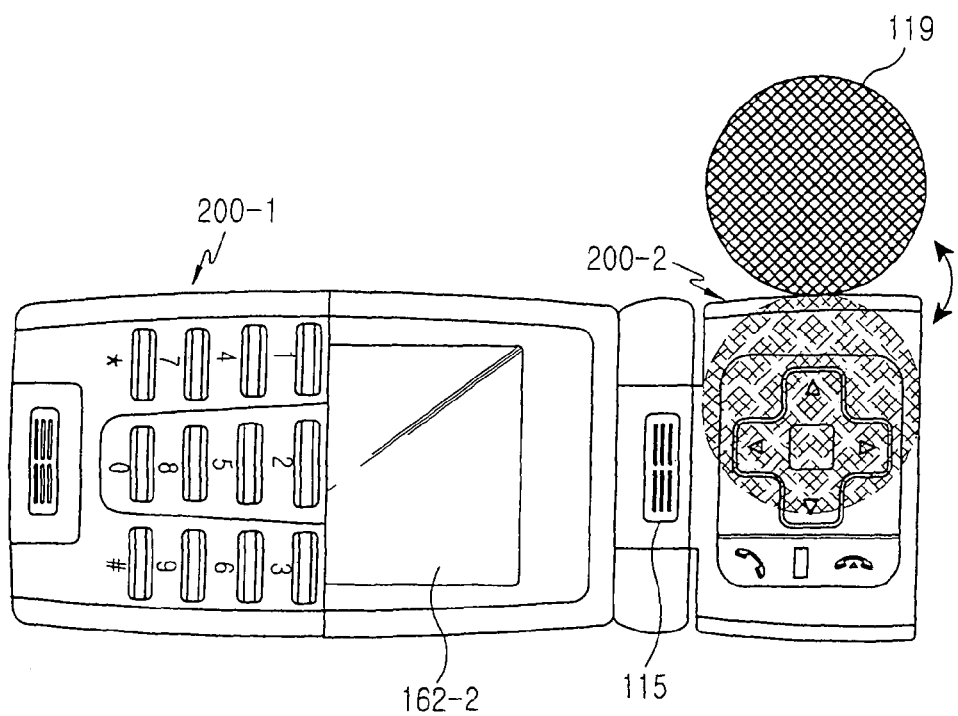

In addition, if the sensor (not shown) included in the body housing of the wireless terminal (making contacts with the first folder housing 200-1 of the wireless terminal) detects the magnet (not shown) included in the first folder housing 200-1, and if the sensor (not shown) included in the body housing of the wireless terminal (making contacts with the second folder housing 200-2) does not detect a magnet (not shown) included in the second folder housing 200-2, the folder opening/closing detection module 180 recognizes the detection so as to generate the third folder opening/closing detection signal in step 508. In addition, the control module 110 reads the third opening/closing detection signal from the folder opening/closing detection module 180. If the third folder opening/closing detection signal is generated as described above, the control module 110 controls the first rotary-type speaker 118 to be deactivated and the second rotary-type speaker 119 to be activated in step 509. Herein, the control module 110 detects the rotation state of the second rotary-type speaker 119 and can control the second rotary-type speaker to be activated only when the second rotary-type speaker 119 is rotatably moved away from the second folder housing 200-2. In addition, the first speaker of the first voice inputting/outputting module 115 may be activated together with the second rotary-type speaker 119. FIG. 4C illustrates the first folder housing 200-1 in the close state and the second folder housing 200-2 in the open state.

Figure 4D:
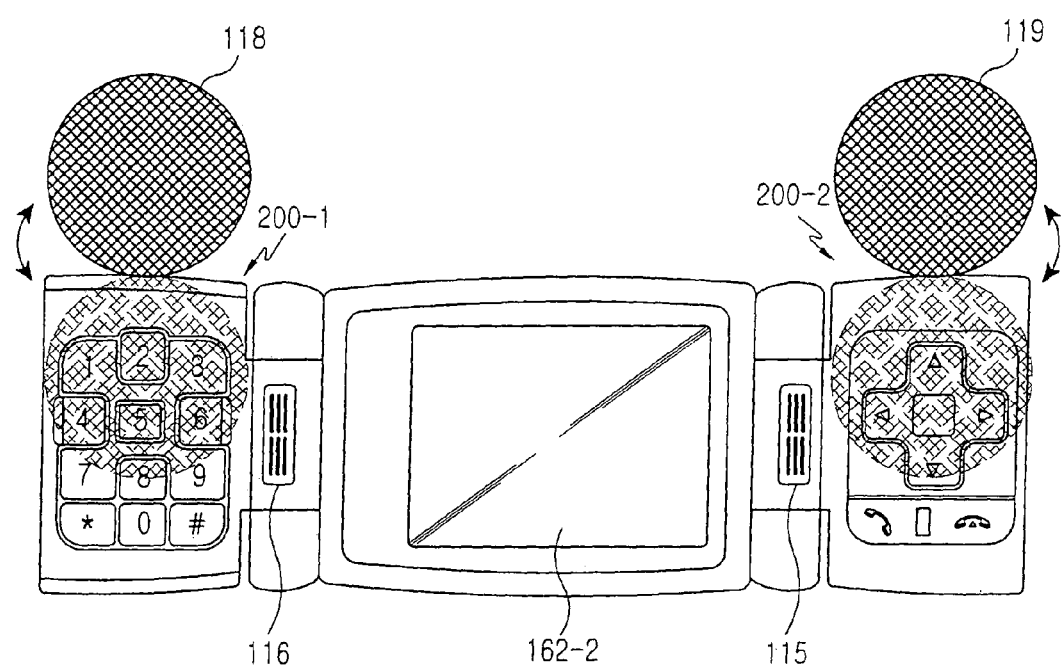

Finally, if the sensor (not shown) included in the body housing of the wireless terminal (making contacts with the first folder housing 200-1 of the wireless terminal) does not detect the magnet (not shown) included in the first folder housing 200-1, and if the sensor (not shown) included in the body housing of the wireless terminal (making contacts with the second folder housing 200-2) does not detect a magnet (not shown) included in the second folder housing 200-2, the folder opening/closing detection module 180 recognizes the detection failure so as to generate the fourth folder opening/closing detection signal in step 510. The control module 110 reads the fourth opening/closing detection signal from the folder opening/closing detection module 180. If the fourth folder opening/closing detection signal is generated as described above, the control module 110 controls the first rotary-type speaker 118 and the second rotary-type speaker 119 to be activated in step 511. Herein, the control module 110 detects the rotation states of the first rotary-type speaker 118 and the second rotary-type speaker 119 and may control the first rotary-type speaker and the second rotary-type speaker to be activated only when the first rotary-type speaker 118 and the second rotary-type speaker 119 are rotatably moved away from the first folder housing 200-1 and the second folder housing 200-2, respectively. In addition, the first speaker of the first voice inputting/outputting module 115 and the second speaker of the second voice inputting/outputting module 116 may be activated together with the first rotary-type speaker 118 and the second rotary-type speaker 119. FIG. 4D illustrates the first folder housing 200-1 and the second folder housing 200-2 in the open state.

Figure 10:
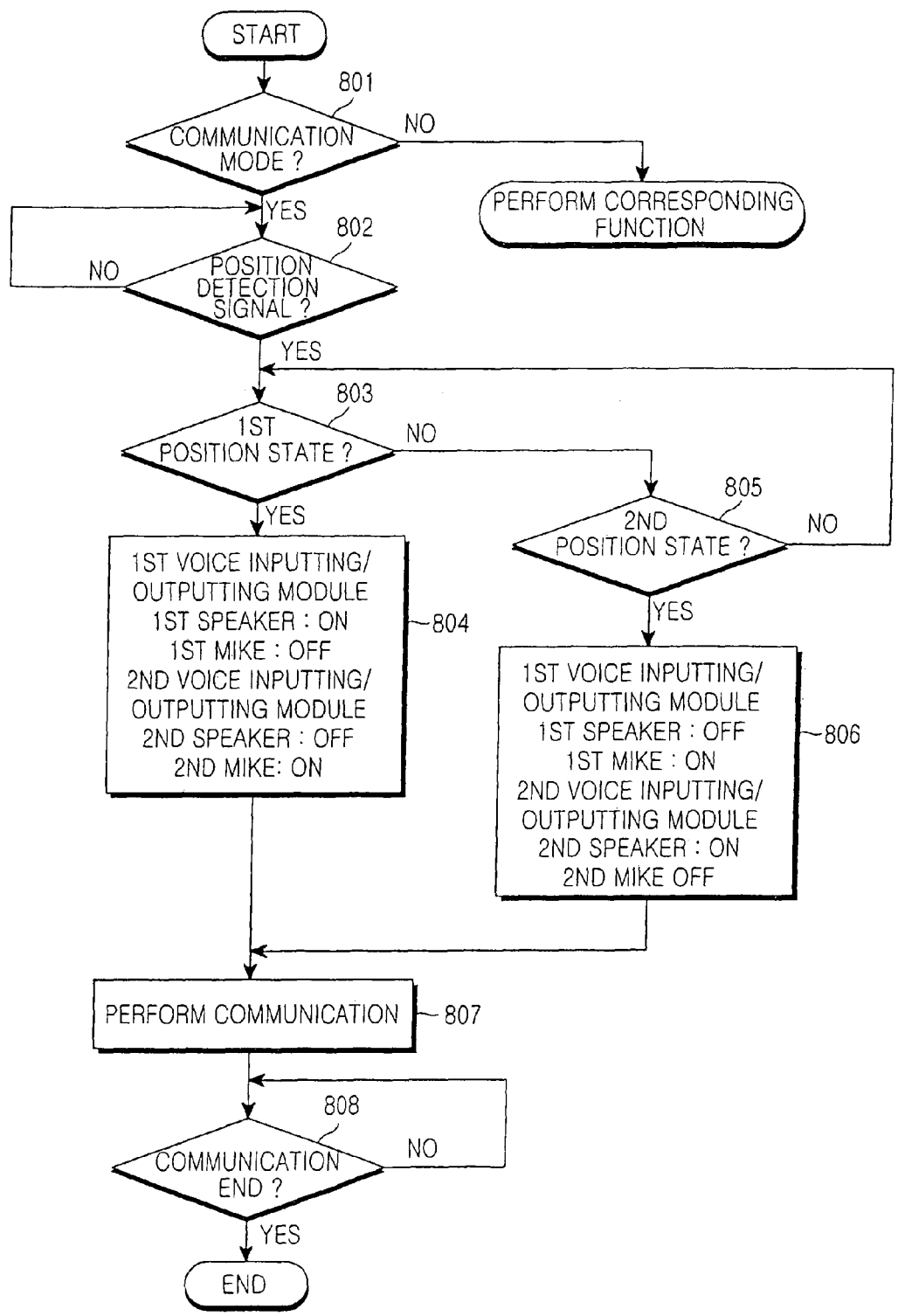
FIG. 10 is a flowchart illustrating a method for controlling a function of a voice inputting/outputting module according to position detection signals in a wireless terminal according to an embodiment of the present invention.

FIG. 10 is a flowchart showing a method for controlling a function of the voice inputting/outputting module in the wireless terminal according to an embodiment of the present invention. Specifically, a method for controlling a function of the voice inputting/outputting module 117 in the wireless terminal including the position detection module 190 shown in FIGS. 6A to 9B will be described with reference to FIG. 10. According to an embodiment of the present invention, it is assumed that the second voice inputting/outputting module 116 is mounted on the first hinge 210-1 coupling the first folder housing with the body housing of the wireless terminal, and the first voice inputting/outputting module 115 is mounted on the second hinge 210-2 coupling the second folder housing with the body housing of the wireless terminal.

Referring to FIG. 10, the control module 110 determines whether a current mode is a communication mode in step 801. If the current mode is the communication mode, the control module 110 determines whether or not the position detection module 190 outputs position detection signals. If the position detection module 190 outputs the position detection signals, the control module 110 detects the output of the position detection signals in step 802 and reads the position detection signals output from the position detection module 190.

At this time, if the wireless terminal is in an upright position, the position detection module 190 detects this and generates the first position detection signals in step 803. After that, the control module 110 reads a first position detection signal from the position detection module 190. When the first position detection signal is generated as described above, the control module 110 activates the first speaker of the first voice inputting/outputting module 115 mounted on the second hinge 210-1 and the second microphone of the second voice inputting/outputting module 116 mounted on the first hinge 210-1 in step 804. When the first position detection signal is generated as described above, the control module 110 deactivates the first microphone of the first voice inputting/outputting module 115 and the second speaker of the second voice inputting/outputting module 116. FIGS. 6A, 7A, 8A, and 9A show the wireless terminal in an upright position in each state of the first to the fourth folder opening/closing states.

The control module 110 not only outputs a voice signal, which is transmitted from the audio processing module 125, through the first speaker of the first voice inputting/outputting module 115, but also performs voice communication in step 807 while receiving a voice signal through the second microphone of the second voice inputting/outputting module 116. If the communication ends, the control module 110 detects the end of the communication and terminates the communication mode in step 808.

In addition, if the wireless terminal has been rotated 180°, the position detection module 190 detects this in step 805 and generates the second position detection signal. The control module 110 reads the second position detection signal from the position detection module 190. When the second position detection signal is detected as described above, the control module 110 activates the first microphone of the first voice inputting/outputting module 115 mounted on the second hinge 210-2 and the second speaker of the second voice inputting/outputting module 116 mounted on the first hinge 210-1 in step 806, and deactivates the first speaker of the first voice inputting/outputting module 115 and the second microphone of the second voice inputting/outputting module 116. FIGS. 6B, 7B, 8B, and 9B show the wireless terminal rotated 180° in each state of the first to the fourth folder opening/closing states.

The control module 110 not only outputs a voice signal, which is transmitted from the audio processing module 125, through the second speaker of the second voice inputting/outputting module 116, but also performs voice communication in step 807 while receiving a voice signal through the first microphone of the first voice inputting/outputting module 116. If the communication ends, the control module 110 detects the end of the communication and terminates the communication mode in step 808.

As described above, according to the present invention, the functions of the wireless terminal are controlled according to the opening/closing states of the folder housings and the positions of the folder housings, so that it is convenient for a user to employ a display module, a key input module, and a rotary-type speaker which have functions automatically controlled according to the opening/closing states of the folder housings. In addition, it is convenient for the user to employ a voice inputting/outputting module having functions automatically controlled according to the positions of the wireless terminal.

While the invention has been shown and described with reference to certain embodiments thereof, it should be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. An apparatus for controlling a key input function and a display function in a wireless terminal, the apparatus comprising:
   a folder opening/closing detection module which comprises magnets disposed in the wireless terminal and sensors for detecting the magnets, detects a folder housing opening/closing state in the wireless terminal, and generates a folder opening/closing detection signal;
   a key input module which comprises a first key input module having an inner key and an external key and a second key input module having an inner key and an external key, the first key input module and the second key input module disposed in a first folder housing and a second folder housing which pivot away from a body housing of the wireless terminal in different directions, respectively;
   a display module which has a first display module disposed in the second folder housing and a second display module disposed in the body housing; and a control module which controls the functions of the key input module and the display module according to the folder opening/closing signal generated from the folder opening/closing detection module.

2. The apparatus as claimed in claim 1, wherein the magnets of the folder opening/closing detection module are mounted on the first folder housing and the second folder housing of the wireless terminal, and the sensors are mounted on the body housing of the wireless terminal.

3. The apparatus as claimed in claim 1, wherein the magnets of the folder opening/closing detection module are mounted on the body housing of the wireless terminal, and the sensors are mounted on the first folder housing and the second folder housing of the wireless terminal.

4. The apparatus as claimed in claim 1, wherein the key input module comprises:
the first key input module having numeral keys in an inner module and an external module; and
the second key input module having function keys in an inner module and an external module.

5. The apparatus as claimed in claim 1, wherein the key input module comprises:
the first key input module having function keys in an inner module and an external module; and
the second key input module having numeral keys in an inner module and an external module.

6. The apparatus as claimed in claim 1, wherein the key input module comprises:
the first key input module having function keys in an inner module and numeral keys in an external module; and
the second key input module having function keys in an inner module and numeral keys in an external module.

7. The apparatus as claimed in claim 1, wherein the key input module comprises:
the first key input module having numeral keys in an inner module thereof and function keys in an external module; and
the second key input module having numeral keys in an inner module thereof and function keys in an external module.

8. The apparatus as claimed in claim 1, further comprising;
a position detection module which comprises a sensor, detects a position of the wireless terminal, and generates a first position detection signal and a second position detection signal;
a voice inputting/outputting module which comprises a first voice inputting/outputting module mounted on one side of the wireless terminal and a second voice inputting/outputting module mounted on another side of the wireless terminal; and
a control module which controls functions of the voice inputting/outputting module according to position detection signals generated from the position detection module.

9. The apparatus as claimed in claim 8, wherein the position detection module comprises an acceleration sensor.

10. The apparatus as claimed in claim 8, wherein the voice inputting/outputting module comprises:
a first voice inputting/outputting module including a first speaker and a first microphone; and
a second voice inputting/outputting module including a second speaker and a second microphone.

11. The apparatus as claimed in claim 10, wherein, when the first position detection signal is generated, the control module activates the first speaker of the first voice inputting/outputting module and the second microphone of the second voice inputting/outputting module and deactivates the first microphone of the first voice inputting/outputting module and the second speaker of the second voice inputting/outputting module, and, when the second position detection signal is generated, the control module activates the first microphone of the first voice inputting/outputting module and the second speaker of the second voice inputting/outputting module and deactivates the first speaker of the first voice inputting/outputting module and the second microphone of the second voice inputting/outputting module.

12. The apparatus as claimed in claim 8, wherein the voice inputting/outputting module comprises:
a first voice inputting/outputting module mounted on a first hinge module of the wireless terminal; and
a second voice inputting/outputting module mounted on a second hinge module of the wireless terminal.

13. The apparatus as claimed in claim 12, wherein the first hinge module couples the body housing with the first folder housing, and the second hinge module couples the body housing with the second folder housing.

14. The apparatus as claimed in claim 12, wherein the first hinge module couples the body housing with the second folder housing, and the second hinge module couples the body housing with the first folder housing.

15. The apparatus as claimed in claim 1, further comprising;
a first rotary-type speaker and a second rotary-type speaker rotatably mounted inside the first folder housing and the second folder housing, respectively; and
a control module for controlling the first rotary-type speaker and the second rotary-type speaker to be deactivated when a first folder opening/closing detection signal is generated, controlling the first rotary-type speaker to be activated and the second rotary-type speaker to be deactivated when a second folder opening/closing detection signal is generated, controlling the first rotary-type speaker to be deactivated and the second rotary-type speaker to be activated when a third folder opening/closing detection signal is generated, and controlling the first rotary-type speaker and the second rotary-type speaker to be activated when a fourth folder opening/closing detection signal is generated.

16. The apparatus as claimed in claim 15, wherein the control module controls the first rotary-type speaker and the second rotary-type speaker to be deactivated when the first folder opening/closing detection signal is generated, controls the rotated first rotary-type speaker to be activated and the second rotary-type speaker to be deactivated when the second folder opening/closing detection signal is generated, controls the first rotary-type speaker to be deactivated and the rotated second rotary-type speaker to be activated when the third folder opening/closing detection signal is generated, and controls the rotated first rotary-type speaker and the rotated second rotary-type speaker to be activated when the fourth folder opening/closing detection signal is generated.

17. The apparatus as claimed in claim 15, wherein the first rotary-type speaker and the second rotary-type speaker are bilateral speakers.

18. The apparatus as claimed in claim 15, wherein the first rotary-type speaker and the second rotary-type speaker are thin film speakers.

19. An apparatus for controlling a key input function and a display function in a wireless terminal, comprising:
a folder opening/closing detection module which comprises magnets disposed in the wireless terminal and sensors detecting the magnets, detects opening/closing states of a first folder housing and a second folder housing pivoting away from a body housing of the wireless terminal in different directions and generates a first opening/closing signal to a fourth folder opening/closing signal;

a key input module which comprises a first key input module disposed in the first folder housing and a second key input module disposed in the second folder housing, the first key input module including an inner key and an external key, the second key input module including an inner key and an external key;

a display module which comprises a first display module disposed in the second folder housing and a second display module disposed in the body housing; and a control module which controls the functions of the key input module and the display module according to folder opening/closing detection signals generated from the folder opening/closing detection module.

20. The apparatus as claimed in claim 19, wherein the magnets of the folder opening/closing detection module are mounted on the first folder housing and the second folder housing of the wireless terminal, and the sensors are mounted on the body housing of the wireless terminal.

21. The apparatus as claimed in claim 19, wherein the magnets of the folder opening/closing detection module are mounted on the body housing of the wireless terminal, and the sensors are mounted on the first folder housing and the second folder housing of the wireless terminal.

22. The apparatus as claimed in claim 19, wherein the key input module comprises:

the first key input module having numeral keys in an inner module and an external module; and the second key input module having function keys in an inner module and an external module.

23. The apparatus as claimed in claim 19, wherein the key input module comprises:

the first key input module having function keys in an inner module and an external module; and the second key input module having numeral keys in an inner module and an external module.

24. The apparatus as claimed in claim 19, wherein the key input module comprises:

the first key input module having function keys in an inner module and numeral keys in an external module; and the second key input module having function keys in an inner module and numeral keys in an external module.

25. The apparatus as claimed in claim 19, wherein the key input module comprises:

the first key input module having numeral keys in an inner module thereof and function keys in an external module; and the second key input module having numeral keys in an inner module thereof and function keys in an external module.

26. The apparatus as claimed in claim 19, wherein the second display module of the display module comprises:

a first screen for displaying data when the first folder housing having the second key input module is closed; and a second screen for displaying data when the second folder housing having the first key input module is closed.

27. The apparatus as claimed in claim 19, wherein the control module activates the first display module, the external key of the first key input module, and the external key of the second key input module and deactivates the second display module, the inner key of the first key input module, and the inner key of the second key input module when the first folder opening/closing signal is generated, the control module activates the first display module, the first screen of the second display module, the inner key of the first key input module, and the external key of the second key input module and deactivates the second screen of the second display module, the external key of the first key input module, and the inner key of the second key input module when the second folder opening/closing signal is generated, the control module activates the second screen of the second display module, the external key of the first key input module, and the inner key of the second key input module, and deactivates the first display module, the first screen of the second display module, the inner key of the first key input module, and the external key of the second key input module when the third folder opening/closing detection signal is generated, and the control module activates the second display module, the inner key of the first key input module, and the inner key of the second key input module, and deactivates the first display module, the external key of the first key input module, and the external key of the second key input module when the fourth folder opening/closing detection signal is generated.

28. An apparatus for controlling a key input function and a display function in a wireless terminal, comprising:

a folder opening/closing detection module which comprises magnets disposed in the wireless terminal and sensors for detecting the magnets, detects opening/closing states of a first folder housing and a second folder housing pivoting away from a body housing of the wireless terminal in different directions, and generates a first to a fourth folder opening/closing signals;

a key input module which comprises a first key input module disposed in the first folder housing and a second key input module disposed in the second folder housing, the first key input module including an inner key and an external key, the second key input module including an inner key and an external key;

a display module which comprises a first display module disposed in the second folder housing and a second display module disposed in the body housing; and a control module, wherein the control module activates the first display module, the external key of the first key input module, and the external key of the second key input module and deactivates the second display module, the inner key of the first key input module, and the inner key of the second key input module when the first folder opening/closing signal is generated, the control module activates the first display module, the first screen of the second display module, the inner key of the first key input module, and the external key of the second key input module and deactivates the second screen of the second display module, the external key of the first key input module, and the inner key of the second key input module when the second folder opening/closing signal is generated, the control module activates the second screen of the second display module, the external key of the first key input module, and the inner key of the second key input module and deactivates the first display module, the first screen of the second display module, the inner key of the first key input module, and the external key of the second key input module when the third folder opening/closing detection signal is generated, and the control module activates the second display module, the inner key of the first key input module, and the inner key of the second key input module and deactivates the first display module, the external key of the first key input module, and the external key of the second key input module when the fourth folder opening/closing detection signal is generated.

29. A method for controlling functions of a key input module and a display module in a wireless terminal, the method comprising the steps of:

detecting a folder housing opening/closing state in the wireless terminal;

detecting a folder opening/closing signal according to the folder housing opening/closing state in the wireless terminal; and controlling the key input module and the display module of the wireless terminal according to the detected folder opening/closing signal;

wherein the step of controlling the key input module and the display module of the wireless terminal according to the detected folder opening/closing signal comprises the steps of:

if the detected folder opening/closing signal is a first folder opening/closing detection signal, activating a first display module, an external key of a first key input module, and an external key of a second key input module and deactivating a second display module, an inner key of the first key input module, and an inner key of the second key input module;

if the detected folder opening/closing signal is a second folder opening/closing detection signal, activating the first display module, a second screen of the second display module, the inner key of the first key input module, and the external key of the second key input module and deactivating a second screen of the second display module, the external key of the first key input module, and the inner key of the second key input module;

if the detected folder opening/closing signal is a third folder opening/closing detection signal, activating the second screen of the second display module, the external key of the first key input module, and the inner key of the second key input module and deactivating the first display module, the first screen of the second display module, the inner key of the first key input module, and the external key of the second key input module; and if the detected folder opening/closing signal is a fourth folder opening/closing detection signal, activating the second display module, the inner key of the first key input module, and the inner key of the second key input module and deactivating the first display module, the external key of the first key input module, and the external key of the second key input module.

30. The method as claimed in claim 29, the method further comprising the steps of:

detecting a position of the wireless terminal;

detecting a position signal according to the position of the wireless terminal; and controlling a speaker and a microphone of a voice inputting/outputting module of the wireless terminal according to the detected position signal.

31. The method as claimed in claim 30, wherein the step of controlling the speaker and the microphone of the voice inputting/outputting module of the wireless terminal according to the detected position signal comprises the steps of:

if the detected position signal is a first position detection signal, activating a first speaker of a first voice inputting/outputting module and a second microphone of a second voice inputting/outputting module and deactivating a first microphone of the first voice inputting/outputting module and a second speaker of the second voice inputting/outputting module; and if the detected position signal is a second position detection signal, activating the first microphone of the first voice inputting/outputting module and the second speaker of the second voice inputting/outputting module and deactivating the first speaker of the first voice inputting/outputting module and the second microphone of the second voice inputting/outputting module.

32. The method as claimed in claim 29, the method further comprising the steps of:

controlling a first rotary-type speaker and a second rotary-type speaker to be deactivated when the detected folder opening/closing signal is a first folder opening/closing detection signal;

controlling the first rotary-type speaker to be activated and the second rotary-type speaker to be deactivated when the detected folder opening/closing signal is a second folder opening/closing detection signal;

controlling the first rotary-type speaker to be deactivated and the second rotary-type speaker to be activated when the detected folder opening/closing signal is a third folder opening/closing detection signal; and controlling the first rotary-type speaker and the second rotary-type speaker to be activated when the detected folder opening/closing signal is a fourth folder opening/closing detection signal.

33. The method as claimed in claim 32, further comprising the steps of:

controlling the first rotary-type speaker and the second rotary-type speaker to be deactivated when the detected folder opening/closing signal is a first folder opening/closing detection signal;

controlling the rotated first rotary-type speaker to be activated and the second rotary-type speaker to be deactivated when the detected folder opening/closing signal is a second folder opening/closing detection signal;

controlling the first rotary-type speaker to be deactivated and the rotated second rotary-type speaker to be activated when the detected folder opening/closing signal is a third folder opening/closing detection signal; and controlling the rotated first rotary-type speaker and the rotated second rotary-type speaker to be activated when the detected folder opening/closing signal is a fourth folder opening/closing detection signal.

34. A method for controlling functions of a key input module and a display module in a wireless terminal, the method comprising the steps of:

detecting a folder housing opening/closing state in the wireless terminal;

detecting a folder opening/closing detection signal according to the folder housing opening/closing state in the wireless terminal;

if the detected folder opening/closing detection signal is a first folder opening/closing detection signal, activating a first display module, an external key of a first key input module, and an external key of the second key input module and deactivating a second display module, an inner key of the first key input module, and the inner key of the second key input module;

if the detected folder opening/closing detection signal is a second folder opening/closing detection signal, activating the first display module, a second screen of the second display module, the inner key of the first key input module, and the external key of the second key input module and deactivating the second screen of the second display module, the external key of the first key input module, and the inner key of the second key input module;

if the detected folder opening/closing detection signal is a third folder opening/closing detection signal, activating the second screen of the second display module, the external key of the first key input module, and the inner key of the second key input module and deactivating the first display module, the first screen of the second display module, the inner key of the first key input module, and the external key of the second key input module; and
if the detected folder opening/closing detection signal is a fourth folder opening/closing detection signal, activating the second display module, the inner key of the first key input module, and the inner key of the second key input module and deactivating the first display module, the external key of the first key input module, and the external key of the second key input module.

* * * * *